US012471073B2

(12) United States Patent
Oh et al.

(10) Patent No.: US 12,471,073 B2
(45) Date of Patent: Nov. 11, 2025

(54) METHOD AND APPARATUS FOR ALLOCATING FREQUENCY RESOURCES IN WIRELESS COMMUNICATION SYSTEM

(71) Applicant: Samsung Electronics Co., Ltd., Suwon-si (KR)

(72) Inventors: Jinyoung Oh, Suwon-si (KR); Younsun Kim, Suwon-si (KR); Taehyoung Kim, Suwon-si (KR); Hoondong Noh, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 18/011,985

(22) PCT Filed: May 4, 2021

(86) PCT No.: PCT/KR2021/005585
§ 371 (c)(1),
(2) Date: Dec. 21, 2022

(87) PCT Pub. No.: WO2022/014833
PCT Pub. Date: Jan. 20, 2022

(65) Prior Publication Data

US 2023/0328704 A1 Oct. 12, 2023

(30) Foreign Application Priority Data

Jul. 14, 2020 (KR) ........................ 10-2020-0086903
Sep. 22, 2020 (KR) ........................ 10-2020-0122467

(51) Int. Cl.
*H04W 72/0453* (2023.01)
*H04W 72/232* (2023.01)

(52) U.S. Cl.
CPC ..... *H04W 72/0453* (2013.01); *H04W 72/232* (2023.01)

(58) Field of Classification Search
None
See application file for complete search history.

(56) References Cited

U.S. PATENT DOCUMENTS

2016/0080133 A1 3/2016 Elbwart et al.
2017/0142702 A1 5/2017 Yu et al.
(Continued)

FOREIGN PATENT DOCUMENTS

CN 101242662 A 8/2008
CN 110050492 A 7/2019
(Continued)

OTHER PUBLICATIONS

Author Unknown, Remaining details on group-common PDCCH, pp. 1-7, doc. No. R1-1719388, Dec. 1, 2017.*
(Continued)

*Primary Examiner* — Christopher M Crutchfield
(74) *Attorney, Agent, or Firm* — Jefferson IP Law, LLP

(57) ABSTRACT

The present disclosure relates to a 5G or 6G communication system for supporting data transmission rates higher than that of a 4G communication system such as LTE. Disclosed are a method and an apparatus for indicating a frequency resource or a format of the resource in a wireless communication system using a dual connection scheme. The method and the apparatus of the present disclosure semi-statically or dynamically change: a method for classifying frequency resources as resource block sets or resource group units and configuring at least one from among uplink, downlink, and flexible frequency resource formats for a resource group; and the configured frequency resource for-
(Continued)

mat, and thus the frequency resources for uplink/downlink transmission and reception can be effectively used.

20 Claims, 16 Drawing Sheets

(56) References Cited

U.S. PATENT DOCUMENTS

| | | | |
|---|---|---|---|
| 2018/0048511 A1 | 2/2018 | Hakola et al. | |
| 2018/0092085 A1 | 3/2018 | Shaheen et al. | |
| 2018/0248662 A1 | 8/2018 | Kim et al. | |
| 2019/0132109 A1 | 5/2019 | Zhou et al. | |
| 2019/0274162 A1 | 9/2019 | Zhang et al. | |
| 2020/0021404 A1 | 1/2020 | Qin et al. | |
| 2020/0145177 A1 | 5/2020 | Jung et al. | |
| 2020/0145965 A1* | 5/2020 | Luo | H04L 5/0032 |
| 2020/0169319 A1* | 5/2020 | Kim | H04L 5/0096 |
| 2020/0252176 A1* | 8/2020 | Falahati | H04L 5/1469 |
| 2021/0100033 A1 | 4/2021 | Li et al. | |
| 2021/0288852 A1 | 9/2021 | Jia et al. | |
| 2021/0289488 A1 | 9/2021 | Cheng et al. | |
| 2021/0315046 A1* | 10/2021 | Xue | H04L 69/24 |

FOREIGN PATENT DOCUMENTS

| | | | |
|---|---|---|---|
| CN | 110366248 | A | 10/2019 |
| KR | 10-2020-0050287 | A | 5/2020 |
| KR | 10-2021-0043304 | A | 4/2021 |
| WO | 2020/108275 | A1 | 6/2020 |

OTHER PUBLICATIONS

ZTE Corporation et al.; Ambiguity of UE FDD/TDD FR1/FR2 capabilities; 3GPP TSG-RAN WG2 Meeting #107; R2-1909794; Aug. 26-30, 2019; Prague, Czech Republic.
International Search Report with Written Opinion dated Aug. 6, 2021; International Appln. No. PCT/KR2021/005585.
European Search Report dated Oct. 23, 2023, issued in European Application No. 21841609.7.
Chinese Office Action dated Aug. 29, 2025, issued in Chinese Patent Application No. 202180055206.2.

* cited by examiner

METHOD AND APPARATUS FOR ALLOCATING FREQUENCY RESOURCES IN WIRELESS COMMUNICATION SYSTEM

CROSS-REFERENCE TO RELATED APPLICATION(S)

This application is a U.S. National Stage application under 35 U.S.C. § 371 of an International application number PCT/KR2021/005585, filed on May 4, 2021, which is based on and claims priority of a Korean patent application number 10-2020-0086903, filed on Jul. 14, 2020, in the Korean Intellectual Property Office, and of a Korean patent application number 10-2020-0122467, filed on Sep. 22, 2020, in the Korean Intellectual Property Office, the disclosure of each of which is incorporated by reference herein in its entirety.

TECHNICAL FIELD

The disclosure relates to a method and device for configuring frequency resources for uplink or downlink transmission and reception in a wireless communication system.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

As the mobile communication system as described above is able to provide various services and the wireless communication network becomes more complicated and diversified, the need for a method for more efficiently allocating data channels for downlink and uplink has emerged.

DETAILED DESCRIPTION OF THE INVENTION

Technical Problem

The disclosure provides a method and device for efficiently configuring and allocating frequency resources for uplink or downlink transmission and reception in a wireless communication system.

The disclosure provides a method and device for flexibly scheduling uplink and downlink transmission and reception in the frequency domain as well as the time domain.

Technical Solution

According to an embodiment of the disclosure, a method for configuring a frequency domain resource for uplink transmission or downlink reception by a UE in a wireless communication system may comprise identifying a guard band configured in a bandwidth of a cell or a bandwidth part configured in the UE, identifying one or more resource block sets in a resource region except for the guard band in the bandwidth or the bandwidth part, and identifying whether configuration information about a type of a resource block set is received. When the configuration information is received, it may be determined whether a type of each resource block set is a downlink resource block set, an uplink resource block set, or a flexible resource block set, based on the configuration information. When the configuration information is not received, it may be determined whether the type of each resource block is the downlink resource block set, the uplink resource block set, or the flexible resource block set based on whether the bandwidth or the bandwidth part is for the uplink transmission or the downlink reception.

According to an embodiment of the disclosure, a method for configuring a frequency domain resource for uplink reception or downlink transmission by a base station in a wireless communication system may comprise configuring a guard band in a bandwidth of a cell or a bandwidth part configured in a UE, to the UE, configuring one or more resource block sets in a resource region except for the guard band in the bandwidth or the bandwidth part, to the UE, and providing configuration information about a type of a resource block set to the UE. The configuration information may include information for determining whether a type of each resource block set is a downlink resource block set, an uplink resource block set, or a flexible resource block set.

According to an embodiment of the disclosure, a UE configuring a frequency domain resource for uplink transmission or downlink reception in a wireless communication system may comprise a communication unit and a controller. The controller may be configured to identify a guard band configured in a bandwidth of a cell or a bandwidth part configured in the UE, identify one or more resource block sets in a resource region except for the guard band in the bandwidth or the bandwidth part, and identify whether configuration information about a type of a resource block set is received, when receiving the configuration information through the communication unit, determine whether a type of each resource block set is a downlink resource block set, an uplink resource block set, or a flexible resource block set, based on the configuration information, and when not receiving the configuration information, determine whether the type of each resource block is the downlink resource block set, the uplink resource block set, or the flexible resource block set based on whether the bandwidth or the bandwidth part is for the uplink transmission or the downlink reception.

According to an embodiment of the disclosure, a base station configuring a frequency domain resource for uplink reception or downlink transmission in a wireless communication system may comprise a communication unit and a controller. The controller may be configured to configure a guard band in a bandwidth of a cell or a bandwidth part configured in a UE, to the UE, configure one or more resource block sets in a resource region except for the guard band in the bandwidth or the bandwidth part, to the UE, and provide configuration information about a type of a resource block set to the UE. The configuration information may include information for determining whether a type of each resource block set is a downlink resource block set, an uplink resource block set, or a flexible resource block set.

MODE FOR CARRYING OUT THE INVENTION

Figure 1:
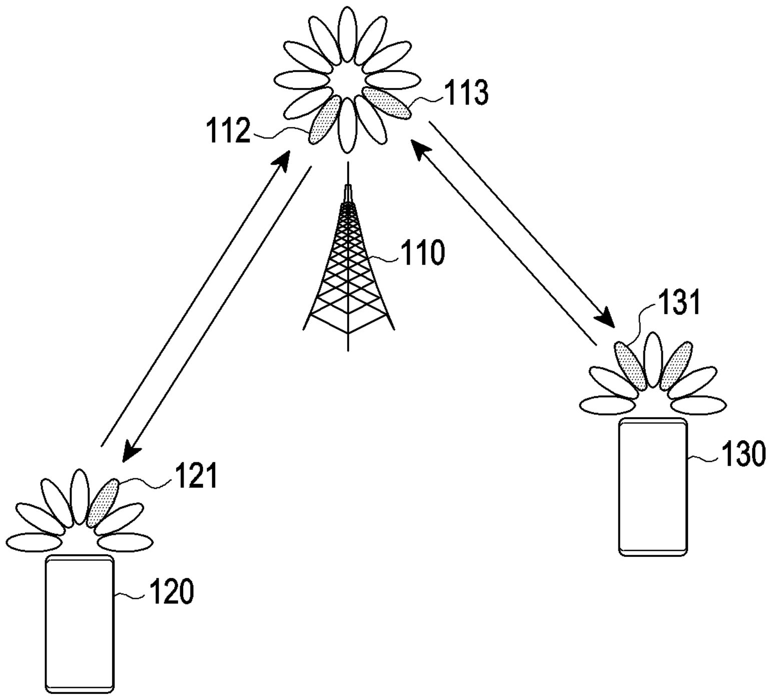
FIG. 1 is a view illustrating a wireless communication system according to an embodiment of the disclosure.

Hereinafter, embodiments of the disclosure are described with reference to the accompanying drawings.

In describing the disclosure, the description of technologies that are known in the art and are not directly related to the present invention is omitted. This is for further clarifying the gist of the present disclosure without making it unclear. The terms as used herein are defined considering the functions in the present disclosure and may be replaced with other terms according to the intention or practice of the user or operator. Therefore, the terms should be defined based on the overall disclosure.

For the same reasons, some elements may be exaggerated or schematically shown. The size of each element does not necessarily reflects the real size of the element. The same reference numeral is used to refer to the same element throughout the drawings.

Advantages and features of the present disclosure, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present disclosure. The present invention is defined only by the appended claims. The same reference numeral denotes the same element throughout the specification. When determined to make the subject matter of the present invention unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

Hereinafter, a base station (BS) is an entity that performs resource allocation of a UE, and may be at least one of a gNode B, eNode B, Node B, (or xNode B (where x is an alphabetic character including g and e)), a radio access unit, a base station controller, a satellite, an airborn, or a node on network. The user equipment (UE) may include a mobile station (MS), vehicle, satellite, airborn, cellular phone, smartphone, computer, or multimedia system capable of performing communication functions. In the disclosure, downlink (DL) refers to a wireless transmission path of signal transmitted from the base station to the terminal, and uplink (UL) refers to a wireless transmission path of signal transmitted from the terminal to the base station. Additionally, a sidelink (SL) meaning a radio transmission path of a signal transmitted from a UE to another UE may exist.

Although LTE, LTE-A, or 5G systems may be described below as an example, the embodiments may be applied to other communication systems having a similar technical background or channel pattern. For example, embodiments of the disclosure may also be applied to 5G-advance or NR-advance or 6th generation mobile communication technology (6G) developed after 5G mobile communication technology (or new radio, NR). The following 5G may be a concept encompassing the legacy LTE, LTE-A and other similar services. Further, the embodiments may be modified in such a range as not to significantly depart from the scope of the present invention under the determination by one of ordinary skill in the art and such modifications may be applicable to other communication systems.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. According to embodiments, a " . . . unit" may include one or more processors.

Wireless communication systems evolve beyond voice-centered services to broadband wireless communication systems to provide high data rate and high-quality packet data services, such as 3rd generation partnership project (3GPP) high speed packet access (HSPA), long term evolution (LTE) or evolved universal terrestrial radio access (E-UTRA)), LTE-advanced (LTE-A), LTE-pro, 3GPP2 high rate packet data (HRPD), ultra-mobile broadband (UMB), and institute of electrical and electronics engineers (IEEE) 802.16e communication standards.

As a representative example of such broadband wireless communication system, the LTE system adopts orthogonal frequency division multiplexing (OFDM) for downlink and single carrier frequency division multiple access (SC-FDMA) for uplink. Uplink means a wireless link where the UE transmits data or control signals to the base station, and download means a wireless link where the base station transmits data or control signals to the UE. Such multiple access scheme may typically allocate and operate time-frequency resources carrying data or control information per user not to overlap, i.e., to maintain orthogonality, to thereby differentiate each user's data or control information.

Post-LTE communication systems, e.g., 5G communication systems, are required to freely reflect various needs of users and service providers and thus to support services that simultaneously meet various requirements. Services considered for 5G communication systems include, e.g., enhanced mobile broadband (eMBB), massive machine type communication (MMTC), and ultra-reliability low latency communication (URLLC).

eMBB aims to provide a further enhanced data transmission rate as compared with LTE, LTE-A, or LTE-pro. For example, eMBB for 5G communication systems needs to provide a peak data rate of 20 Gbps on download and a peak data rate of 10 Gbps on uplink in terms of one base station. 5G communication systems also need to provide an increased user perceived data rate while simultaneously providing such peak data rate. To meet such requirements, various transmit (TX)/receive (RX) techniques, as well as multiple input multiple output (MIMO), need to further be enhanced. While LTE adopts a TX bandwidth up to 20 MHz in the 2 GHz band to transmit signals, the 5G communication system employs a broader frequency bandwidth in a frequency band ranging from 3 GHz to 6 GHz or more than 6 GHz to meet the data rate required for 5G communication systems.

mMTC is also considered to support application services, such as internet of things (IoT) in the 5G communication system. To efficiently provide IoT, mMTC is required to support massive UEs in the cell, enhance the coverage of the UE and the battery time, and reduce UE costs. IoT terminals are attached to various sensors or devices to provide communication functionality, and thus, it needs to support a number of UEs in each cell (e.g., 1,000,000 UEs/km$^2$). Since mMTC-supportive UEs, by the nature of service, are highly likely to be located in shadow areas not covered by the cell, such as the underground of a building, it may require much broader coverage as compared with other services that the 5G communication system provides. mMTC-supportive UEs, due to the need for being low cost and difficulty in frequently exchanging batteries, may be required to have a very long battery life time, e.g., 10 years to 15 years.

URLLC is a mission-critical, cellular-based wireless communication service. For example, URLLC may be considered for use in remote control for robots or machinery, industrial automation, unmanned aerial vehicles, remote health care, or emergency alert. This requires that URLLC provide very low-latency and very high-reliability communication. For example, URLLC-supportive services need to meet an air interface latency of less than 0.5 milliseconds simultaneously with a packet error rate of $10^{-5}$ or less. Thus, for URLLC-supportive services, the 5G communication system may be required to provide a shorter transmit time interval (TTI) than those for other services while securing reliable communication links by allocating a broad resource in the frequency band.

The three 5G services, i.e., eMBB, URLLC, and mMTC, may be multiplexed in one system and be transmitted. In this case, the services may adopt different TX/RX schemes and TX/RX parameters to meet their different requirements. Of course, 5G is not limited to the above-described three services.

FIG. 1 is a view illustrating a wireless communication system according to an embodiment of the disclosure. FIG. 1 exemplifies a base station 110, a UE 120, and a UE 130 as some nodes using wireless channels in the wireless communication system. Although only one base station is illustrated in FIG. 1 as an example, one or more base stations identical or similar to the base station 110 may be further included.

Referring to FIG. 1, the base station 110 may be a network infrastructure that provides wireless access to the UEs 120 and 130. The base station 110 has a coverage defined as a predetermined geographic area based on an arrival distance within which it may transmit radio signals. The base station 110 may be denoted in other terms, such as an 'access point (AP)', an 'eNodeB (eNB)', a 'gNodeB (gNB)', a '5th generation (5G) node', a 'wireless point', or a 'transmission/reception point (TRP)' or in other various terms with an equivalent technical meaning thereto.

Each of the UE 120 and the UE 130 is a device that may be used by the user and may perform communication with the base station 110 through a radio channel. In some cases, at least one of the UE 120 and the UE 130 may be operated without the user's involvement. In other words, at least one of the UE 120 and the UE 130 may be a device that performs machine type communication (MTC) and may not be carried by the user. Each of the UEs 120 and 130 may also be denoted by other terms, such as user equipment (UE), mobile station, subscriber station, remote terminal, wireless terminal, user device, or in other various terms with equivalent technical meanings thereto.

The wireless communication environment may include wireless communication in a licensed band as well as in an unlicensed band. The base station 110, UE 120, and UE 130 may transmit and receive radio signals in unlicensed bands (e.g., 5 GHz to 7.125 GHz band, up to 71 GHz band). As an embodiment, a cellular communication system and another communication system (e.g., wireless local area network, WLAN) may coexist in an unlicensed band. To ensure fairness between two communication systems, that is, to prevent a situation in which a channel is exclusively used by one system, the base station 110, the UE 120, and the UE 130 may perform a channel access procedure for the unlicensed band. As an example of a channel access procedure for an unlicensed band, the base station 110, the UE 120, and the UE 130 may perform listen before talk (LBT).

The base station 110, the UE 120, and the UE 130 may transmit and receive radio signals in a mmWave band (e.g., 28 GHz, 30 GHz, 38 GHz, and 60 GHz). In this case, to enhance the channel gain, the base station 110, the UE 120, and the UE 130 may perform beamforming. Here, beamforming may include transmit beamforming and/or receive beamforming. In other words, the base station 110, the UE 120, and the UE 130 may assign directivity to the transmit signal or receive signal. To that end, the base station 110 and the UEs 120 and 130 may select serving beams through a beam search or beam management procedure. After the serving beams are selected, communication between the base station 110 and the UEs 120 and 130 may be performed through a resource having a quasi co-located (QCL) relationship with the resource transmitting the serving beams.

The base station 110 may select a beam 112 or 113 in a specific direction. The base station 110 may communicate with the UE using the beam 112 or 113 in the specific direction. For example, the base station 110 may receive signals from the UE 120 or transmit signals to the UE 120 through the beam 112. The UE 120 may receive a signal from the base station 110 or transmit a signal to the base station 110 through the beam 121. Further, the base station 110 may receive a signal from the UE 130 or transmit a signal to the UE 130 through the beam 113. The UE 130 may receive a signal from the base station 110 or transmit a signal to the base station 110 through the beam 131.

Figure 2:
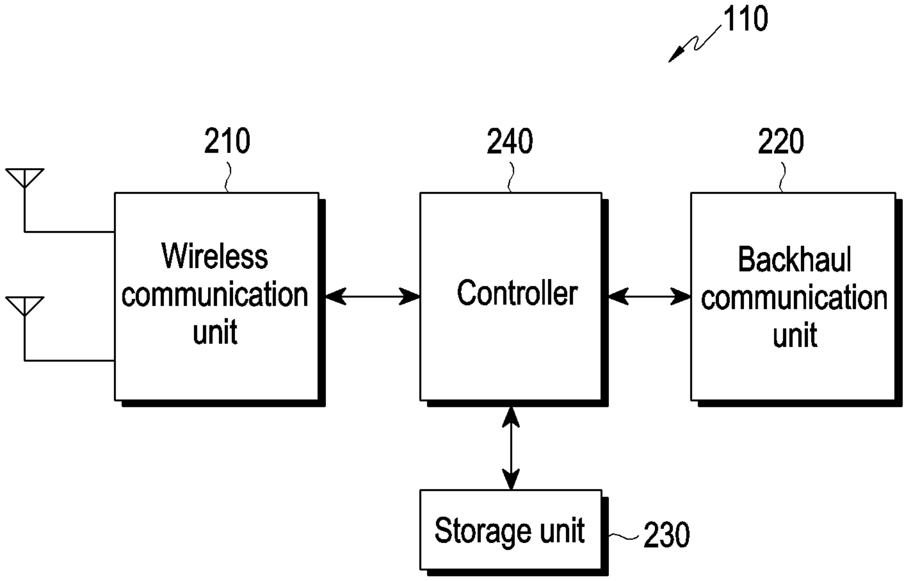
FIG. 2 is a view illustrating a configuration of a base station in a wireless communication system according to an embodiment of the disclosure.

FIG. 2 is a view illustrating a configuration of a base station in a wireless communication system according to an embodiment of the disclosure. The configuration shown in FIG. 2 may be appreciated as the configuration of the base station 110 of FIG. 1. Further, the term " . . . unit" and the suffix" . . . er" as used herein denote a unit processing at least one function or operation and be implemented in hardware, software, or a combination thereof.

Referring to FIG. 2, the base station may include a wireless communication unit 210, a backhaul communication unit 220, a storage unit 230, and a controller 240.

The wireless communication unit 210 (which may be used interchangeably with a transceiver) may perform functions for transmitting and receiving signals through a wireless channel. For example, the wireless communication unit 210 may perform the function of conversion between a baseband signal and bit stream according to the system physical layer specifications. For example, when transmitting a signal, the wireless communication unit 210 may generate complex symbols by encoding and modulating a transmission bit stream. Further, when receiving a signal, the wireless communication unit 210 may restore the transmission bit stream through demodulation and decoding of the received baseband signal.

Further, the wireless communication unit 210 may upconvert the baseband signal into a radio frequency (RF) band signal and transmits the converted signal via an antenna, and the wireless communication unit 210 may down-convert the RF band signal received via an antenna into a baseband signal. To that end, the wireless communication unit 210 may include, e.g., a transmission filter, a reception filter, an amplifier, a mixer, an oscillator, a digital-to-analog converter (DAC), and an analog-to-digital converter (ADC). Further, the wireless communication unit 210 may include a plurality of RF chains corresponding to a plurality of transmission/reception paths. Further, the wireless communication unit 210 may include at least one antenna array constituted of multiple antenna elements.

In terms of hardware, the wireless communication unit 210 may be configured of a digital unit or analog unit, and the analog unit may be constituted of multiple sub units depending on the operation power and operation frequency. The digital unit may be implemented as at least one processor (e.g., a digital signal processor (DSP)).

The wireless communication unit 210 may transmit and receive signals as described above. Thus, the whole or part of the wireless communication unit 210 may be referred to as a 'transmitter,' 'receiver,' or 'transceiver.' Further, transmission and reception performed via a wireless channel in the following description may also mean performing the above-described process by the wireless communication unit 210. According to an embodiment, the wireless communication unit 210 may include at least one transceiver.

The backhaul communication unit 220 may provide an interface for communicating with other nodes in the network. In other words, the backhaul communication unit 220 may convert the bit string transmitted from the base station to another node, e.g., another access node, another base station, an upper node, or a core network, into a physical signal and converts the physical signal received from another node into a bit stream.

The storage unit 230 may store a basic program for operating the base station, application programs, configuration information, or other data. The storage unit 230 may be configured as a volatile memory, a non-volatile memory, or a combination of a volatile memory and a non-volatile memory. The storage unit 230 may provide the stored data according to a request from the controller 240. In an embodiment, the storage unit 230 may include at least one memory.

The controller 240 may control the overall operation of the base station. For example, the controller 240 may transmit and receive signals through the wireless communication unit 210 or the backhaul communication unit 220. Further, the controller 240 may record and read data in/from the storage unit 230. The controller 240 may perform the functions of the protocol stack required in the communication specifications. In an embodiment, the protocol stack may be included in the wireless communication unit 210. In an embodiment, the controller 240 may include at least one processor.

The controller 240 may control the base station to perform operations according to at least one of various embodiments described below. For example, the controller 240 may perform a channel access procedure for an unlicensed band. For example, after the transceiver (e.g., the wireless communication unit 210) receives signals transmitted in an unlicensed band, the controller 240 may compare the strength of the received signal, described above, with a threshold previously defined or determined as a value of a function using, e.g., bandwidth as a parameter to determine whether the unlicensed band is in an idle state. Further, for example, the controller 240 may transmit a control signal to the UE or receive a control signal from the UE through the transceiver. Further, the controller 240 may transmit data to the UE or receive data from the UE through the transceiver. The controller 240 may determine a transmission result for a signal transmitted to the UE based on a control signal or a data signal received from the UE.

The controller 240 may configure one downlink control information (DCI) for allocating one or more data channels to one or more cells and may transmit the DCI to the UE through the wireless communication unit 210. Further, the controller 240 may provide the UE with configuration information necessary for allocating one or more data channels by one DCI through higher layer signaling before transmitting the DCI. Further, the controller 240 may transmit a data channel to the UE or receive a data channel from the UE based on the configuration information and the information fields included in the DCI.

Further, as an example, the controller 240 may maintain or change the length of the contention window (CW) for the channel access procedure (hereinafter, 'contention window adjustment') based on the transmission result, that is, based on the result of reception of the control signal or data signal by the UE. According to an embodiment, the controller 240 may determine a reference window to obtain a transmission result for adjusting the contention window. The controller 240 may determine a data channel for adjusting the contention window in the reference window. The controller 240 may determine a reference control channel for adjusting the contention window in the reference window. If it is determined that the unlicensed band is in an idle state, the controller 240 may occupy the channel.

Further, the controller 240 may control to receive uplink control information (UCI) from the UE through the wireless communication unit 210 and identify whether retransmission is required for downlink data channel and/or modulation and coding scheme needs to be changed through one or more hybrid automatic repeat request acknowledgment (HARQ-ACK) information and/or channel state information (CSI) included in the above-described uplink control information. Further, the controller 240 may control to schedule initial or retransmission of downlink data, generate downlink control information to request uplink control information transmission and transmit the above-described downlink control information to the UE through the wireless communication unit 210. Further, the controller 240 may control the above-described wireless communication unit 210 to receive (re)transmitted uplink data and/or uplink control information according to the above-described downlink control information.

Although it is described in FIG. 2 that each block performs a different function, this is merely for convenience of description, and each function is not necessarily so distinguished. For example, the base station may include the controller and communication unit of FIG. 18, and the communication unit may perform at least one function of the wireless communication unit 210 or the backhaul communication unit 220.

Figure 3:
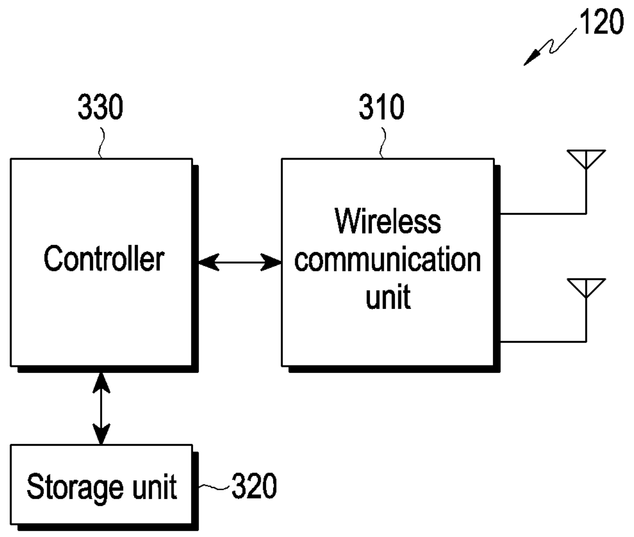
FIG. 3 is a view illustrating a configuration of a UE in a wireless communication system according to an embodiment of the disclosure.

FIG. 3 is a view illustrating a configuration of a UE in a wireless communication system according to an embodiment of the disclosure. The configuration shown in FIG. 3 may be appreciated as the configuration of the UE 120 or 130 of FIG. 1. Further, the term " . . . unit" and the suffix" . . . er" as used herein denote a unit processing at least one function or operation and be implemented in hardware, software, or a combination thereof.

Referring to FIG. 3, the UE may include a wireless communication unit 310, a storage unit 320, and a controller 330.

The wireless communication unit 310 (which may be used interchangeably with a transceiver) may perform functions for transmitting and receiving signals through a wireless channel. For example, the wireless communication unit 310 may perform the function of conversion between a baseband signal and bit stream according to the system physical layer specifications. For example, when transmitting a signal, the wireless communication unit 310 may generate complex symbols by encoding and modulating a transmission bit stream. Further, when receiving a signal, the wireless communication unit 310 may restore the transmission bit stream through demodulation and decoding of the received baseband signal. Further, the wireless communication unit 310 may up-convert the baseband signal into an RF band signal and transmits the converted signal via an antenna, and the wireless communication unit 310 may down-convert the RF band signal received via an antenna into a baseband signal. For example, the wireless communication unit 310 may include a transmission filter, a reception filter, an amplifier, a mixer, an oscillator, a DAC, and an ADC.

The wireless communication unit 310 may include multiple transmission/reception paths. Further, the wireless communication unit 310 may include at least one antenna array constituted of multiple antenna elements. In terms of hardware, the wireless communication unit 310 may be configured of a digital unit and an analog unit (e.g., a radio frequency integrated circuit (RFIC)). Here, the digital unit and analog unit may be implemented in a single package. The wireless communication unit 310 may include multiple RF chains. Further, the wireless communication unit 310 may include at least one antenna array constituted of multiple antenna elements, performing beamforming.

The wireless communication unit 310 may transmit and receive signals as described above. Thus, the whole or part of the wireless communication unit 310 may be referred to as a 'transmitter,' receiver,' or 'transceiver.' Further, transmission and reception performed via a wireless channel in the following description may also mean performing the above-described process by the wireless communication unit 310. According to an embodiment, the wireless communication unit 310 may include at least one transceiver.

The storage unit 320 may store a basic program for operating the UE, application programs, configuration information, or other data. The storage unit 320 may be configured as a volatile memory, a non-volatile memory, or a combination of a volatile memory and a non-volatile memory. The storage unit 320 may provide the stored data according to a request from the controller 330. According to an embodiment, the storage unit 320 may include at least one memory.

The controller 330 may control the overall operation of the UE. For example, the controller 330 may transmit and receive signals via the wireless communication unit 310. The controller 330 records and reads data in/from the storage unit 320. The controller 330 may perform the functions of the protocol stack required in the communication specifications. To that end, the controller 330 may include at least one processor or microprocessor or may be part of a processor. According to an embodiment, the controller 330 may include at least one processor. Further, according to an embodiment, part of the wireless communication unit 310 and/or the controller 330 may be referred to as a communication processor (CP).

The controller 330 may control the UE to perform operations according to at least one of various embodiments described below. For example, the controller 330 may receive the downlink signal (downlink control signal or downlink data) transmitted by the base station through the transceiver (e.g., the communication unit 310). Further, for example, the controller 330 may determine a transmission result for the downlink signal. The transmission result is feedback on the transmitted downlink signal, and may include, e.g., an acknowledgment (ACK), negative ACK (NACK), or discontinuous transmission (DTX). In the disclosure, the transmission result may be denoted by various terms, such as a reception state of downlink signal, a reception result, a decoding result, and HARQ-ACK information. Further, for example, the controller 330 may transmit an uplink signal as a response signal to the downlink signal to the base station through the transceiver. The uplink signal may explicitly or implicitly include the transmission result of the downlink signal. Further, for example, the controller 330 may include at least one or more of the above-described HARQ-ACK information and/or channel state information (CSI) in the uplink control information and transmit the uplink control information to the base station through the wireless communication unit 310. In this case, the uplink control information may be transmitted through the uplink data channel, together with uplink data, or be transmitted to the base station through the uplink data channel without uplink data.

The controller 330 may perform a channel access procedure for an unlicensed band. For example, the wireless communication unit 310 receives signals transmitted in an unlicensed band, and the controller 330 may compare the strength of the received signal, described above, with a threshold previously defined or determined as a value of a function using, e.g., bandwidth as a parameter to determine whether the above-described unlicensed band is in an idle state. The controller 330 may perform an access procedure for the unlicensed band to transmit a signal to the base station. Further, the controller 330 may determine an uplink transmission resource to transmit uplink control information using at least one of the result of performing the above-described channel access procedure and the downlink control information received from the base station and transmit the uplink control information to the base station through the transceiver.

The controller 330 may receive, from the base station through the wireless communication unit 310, higher layer signaling including configuration information necessary to receive one downlink control information (DCI) configured to allocate one or more data channels to one or more cells. The controller 330 also receives the DCI and interprets fields included in the DCI based on the configuration information. Further, the controller 330 may transmit a data channel to the base station or receive a data channel from the base station based on the configuration information and the information fields included in the DCI.

Although it is described in FIG. 3 that each block performs a different function, this is merely for convenience of description, and each function is not necessarily so distinguished. For example, the UE may include the controller and communication unit of FIG. 17.

Figure 4:
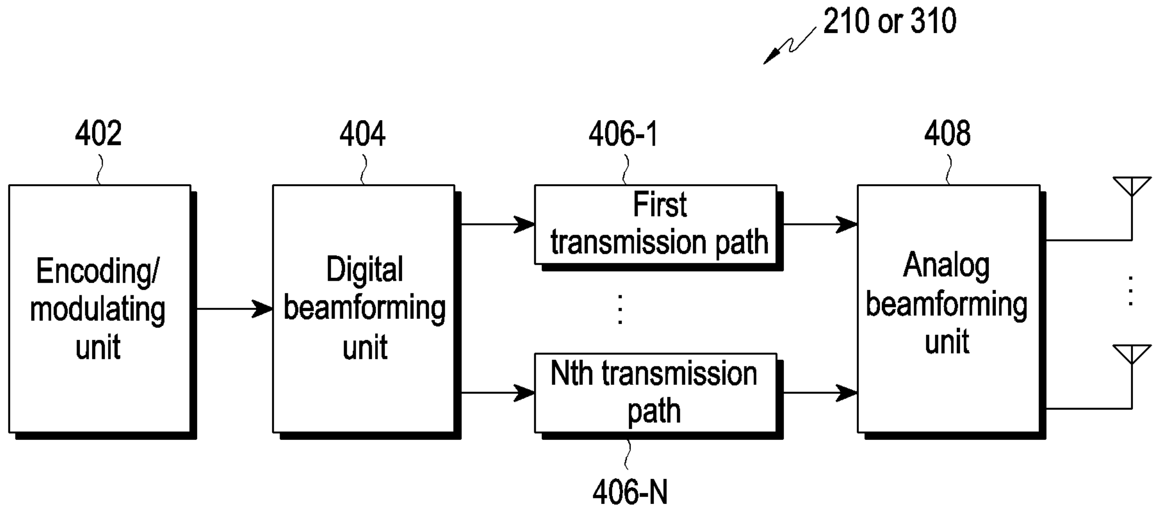
FIG. 4 is a view illustrating a configuration of a communication unit in a wireless communication system according to an embodiment of the disclosure.

FIG. 4 is a view illustrating a configuration of a communication unit in a wireless communication system according to various embodiments of the disclosure. FIG. 4 may illustrate an example of a detailed configuration of the wireless communication unit 210 of FIG. 2 or the wireless communication unit 310 of FIG. 3. Specifically, FIG. 4 may exemplify components for performing beamforming as part of the wireless communication unit 210 of FIG. 2 or the wireless communication unit 310 of FIG. 3.

Referring to FIG. 4, the wireless communication unit 210 or the wireless communication unit 310 may include an encoding/modulating unit 402, a digital beamforming unit 404, multiple transmission paths 406-1 to 406-N, and an analog beamforming unit 408.

The encoding/modulating unit 402 performs channel encoding. For channel encoding, at least one of a low-density parity check (LDPC) code, a convolution code, or a polar code may be used. The encoding/modulating unit 402 may perform constellation mapping on the encoded bits, thereby generating modulation symbols.

The digital beamforming unit 404 may perform beamforming on digital signals (e.g., modulation symbols). To that end, the digital beamforming unit 404 may multiply modulation symbols by beamforming weights. Here, the beamforming weights may be used to change the magnitude and phase of signals and may be referred to as 'precoding matrix' or 'precoder.' The digital beamforming unit 404 may output the digital beamformed (i.e., precoded) modulation symbols to the multiple transmission paths 406-1 to 406-N. At this time, the modulation symbols may be multiplexed by a multiple-input multiple-output (MIMO) transmission scheme, or the same modulation symbols may be provided to the multiple transmission paths 406-1 to 406-N.

The multiple transmission paths 406-1 to 406-N may convert the digital beamformed digital signals into analog signals. To that end, each of the multiple transmission paths 406-1 to 406-N may include an inverse fast Fourier transform (IFFT) computation unit, a cyclic prefix (CP) inserting unit, a digital-to-analog converter (DAC), and an up-converting unit. The CP inserting unit is for an orthogonal frequency division multiplexing (OFDM) scheme and may be excluded if a different physical layer scheme (e.g., filter bank multi-carrier (FBMC)) is applied. The multiple transmission paths 406-1 to 406-N may provide independent signal processes on multiple streams generated via digital beamforming. According to implementation schemes, some of the components of the multiple transmission paths 406-1 to 406-N may be shared.

The analog beamforming unit 408 may perform beamforming on the analog signals from the multiple transmission paths 406-1 to 406-N and connect to at least one antenna array constituted of multiple antenna elements. To that end, the analog beamforming unit 408 may multiply the analog signals by beamforming weights. Here, the beamforming weights may be used to change the magnitude and phase of signals. The analog beamforming unit 408 may come in various configurations depending on the connection structure between the multiple transmission paths 406-1 to 406-N and antennas. For example, each of the multiple transmission paths 406-1 to 406-N may be connected to one antenna array. As another example, the multiple transmission paths 406-1 to 406-N may be connected to one antenna array. As still another example, the multiple transmission paths 406-1 to 406-N may be connected adaptively to one antenna array or two or more antenna arrays.

The frame structure of the 5G system is described below in more detail with reference to the drawings.

Figure 5:
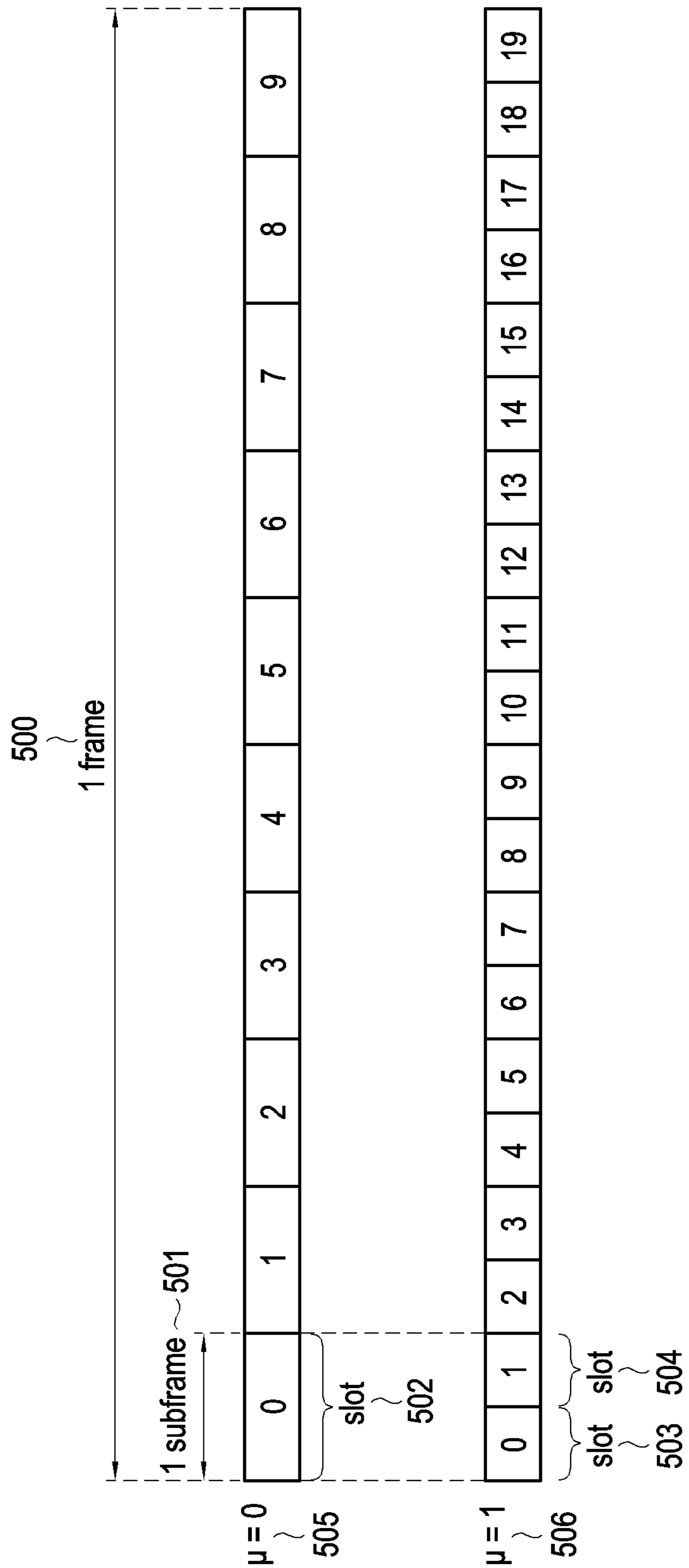
FIG. 5 is a view illustrating a frame, a subframe, and a slot structure of a 5G communication system.

FIG. 5 is a view illustrating the structure of a frame, a subframe, and a slot of a 5G communication system.

FIG. 5 illustrates an example of the structure of a frame 500, a subframe 501, and slots 502, 503, and 504 for each of the case where $\mu$=0 (505) indicating a subcarrier spacing of 15 kHz and the case where $\mu$=1 (506) indicating a subcarrier spacing of 30 kHz. In the case of a 5G system as shown in FIG. 5, one frame 500 may be defined as 10 ms. One subframe 501 may be defined as 1 ms, and thus, one frame 500 may consist of a total of 10 subframes 501. One subframe 501 may be constituted of one or a plurality of slots. One slot may be constituted of or defined with 14 OFDM symbols. In other words, the number ($N_{symb}^{slot}$) of symbols per slot may be 14. In this case, the number ($N_{symb}^{subframe,\mu}$) of slots per subframe 501 may vary depending on the value (numerology) $\mu$ (505, 506) indicating the configuration for subcarrier spacing. When $\mu$=0, one subframe 501 may be constituted of one slot 502, and when $\mu$=1, one subframe 501 may be constituted of two slots 503 and 504.

According to the set subcarrier spacing value $\mu$, the number of slots per subframe may vary, and accordingly, the number ($N_{symb}^{frame,\mu}$) of slots per frame may differ. Each set subcarrier spacing value $\mu$ and $N_{symb}^{subframe,\mu}$ and $N_{symb}^{frame,\mu}$ according to $\mu$ may be defined as in Table 1 below. When $\mu$=2, the UE may additionally receive a configuration regarding a cyclic prefix from the base station through higher layer signaling.

TABLE 1

| $\mu$ | $\Delta f = 2^{\mu} \cdot 15$[kHz] | Cyclic prefix | $N_{symb}^{slot}$ | $N_{symb}^{frame,\mu}$ | $N_{symb}^{subframe,\mu}$ |
|---|---|---|---|---|---|
| 0 | 15 | Normal | 14 | 10 | 1 |
| 1 | 30 | Normal | 14 | 20 | 2 |
| 2 | 60 | Normal, Extended | 14 | 40 | 4 |
| 3 | 120 | Normal | 14 | 80 | 8 |
| 4 | 240 | Normal | 14 | 160 | 16 |

In the disclosure, higher layer signaling or higher layer signal (or higher signal) may mean at least one of radio resource control (RRC) signaling, packet data convergence protocol (PDCP) signaling, or media access control (MAC) control element (CE). Further, the higher layer signaling or higher layer signal may include the system information, e.g., system information block (SIB) commonly transmitted to a plurality of UEs and, among the information transmitted through the physical broadcast channel (PBCH), information (e.g., PBCH payload) except for the master information block (MIB), may also be included in the high layer signaling or higher layer signal. In this case, the MIB may also be expressed as included in the above-described high layer signaling or higher layer signal.

Figure 6:
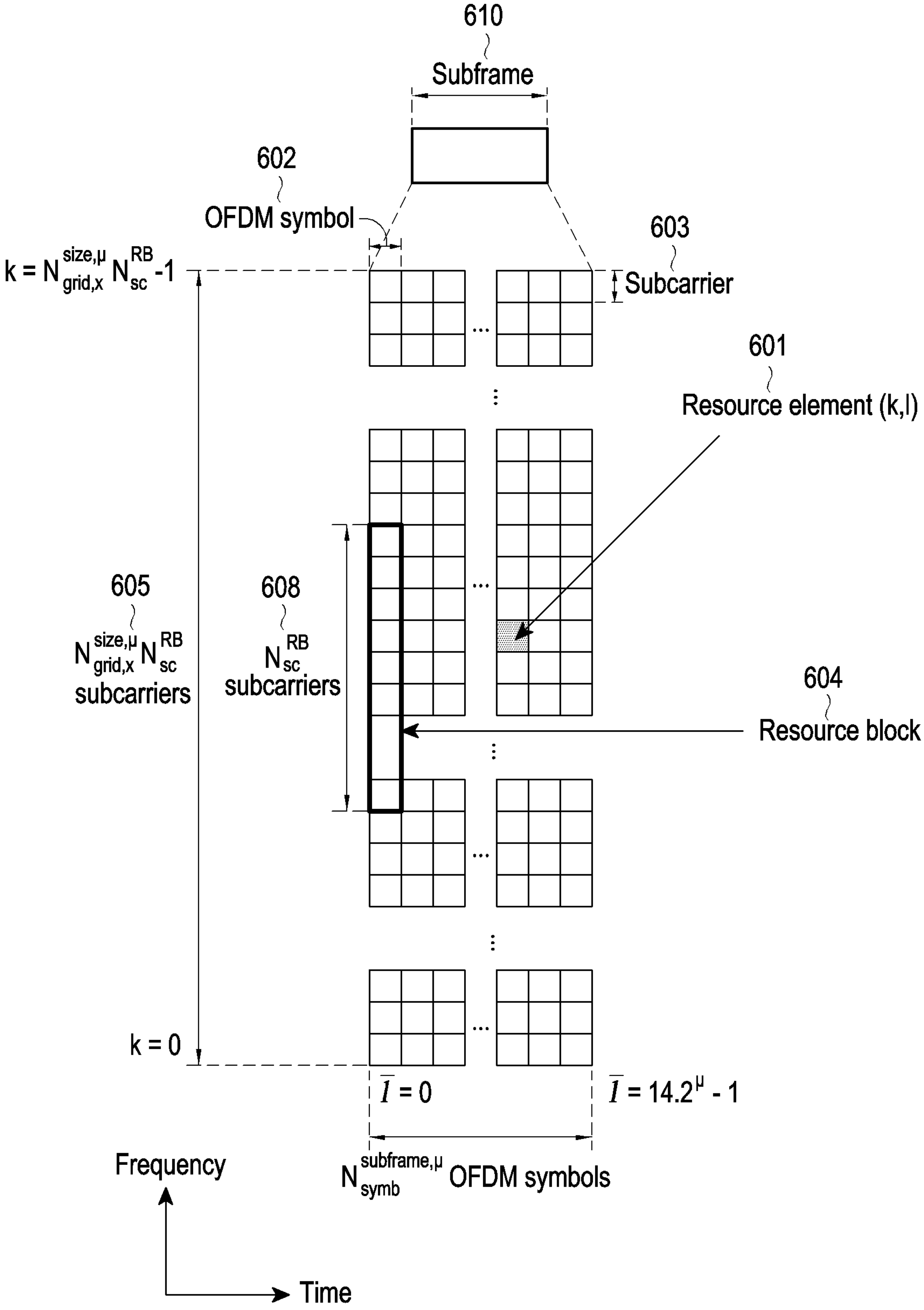
FIG. 6 is a view illustrating a basic structure of a time-frequency domain of a 5G communication system.

FIG. 6 is a view illustrating a basic structure of a time-frequency domain of a 5G communication system. In other words, FIG. 6 is a view illustrating a basic structure of the time-frequency domain which is the radio resource region where data or control channel is transmitted.

In FIG. 6, the horizontal axis refers to the time domain, and the vertical axis refers to the frequency domain. A basic unit of a resource in the time and frequency domain is a resource element (RE) 601, and the resource element may be defined as corresponding to one orthogonal frequency division multiplexing (OFDM) symbol 602 in the time domain, and as corresponding to one subcarrier 603 in the frequency domain. In the frequency domain, $N_{sc}^{RB}$ (e.g., 12) consecutive REs may constitute one resource block (RB) 604.

For each subcarrier spacing set value 11 and carrier, one resource grid constituted of $N_{grid,x}^{size,\mu}N_{sc}^{RB}$ subcarriers and $N_{symb}^{subframe,\mu}$ OFDM symbols may be defined as beginning from the common resource block (CRB) $N_{grid,x}^{start,\mu}$ indicated through higher layer signaling, and there may be one resource grid for a given antenna port, subcarrier spacing setting μ, and transmission direction (e.g., downlink, uplink, or sidelink).

The base station may transfer, to the UE, the carrier bandwidth $N_{grid,x}^{size,\mu}$ and the start position $N_{grid,x}^{start,\mu}$ of the subcarrier spacing setting μ for uplink and downlink through higher layer signaling (e.g., higher layer parameters 'carrierBandwidth' and 'offsetToCarrier') In this case, the carrier bandwidth $N_{grid,x}^{size,\mu}$ may be set by the higher layer 'parameter carrierBandwidth' for the subcarrier spacing setting μ, and the start position $N_{grid,x}^{start,\mu}$ is a frequency offset of subcarrier having the lowest frequency among the available resources of the carrier and may be set to 'offsetToCarrier' and be represented as the number of RBs. In this case, $N_{grid,x}^{size,\mu}$ and $N_{grid,x}^{start,\mu}$ may be values in subcarrier units. The UE receiving the parameters may be aware of the start position and size of the carrier bandwidth through $N_{grid,x}^{size,\mu}$ and $N_{grid,x}^{start,\mu}$. An example of higher layer signaling information transmitting $N_{grid,x}^{size,\mu}$ and $N_{grid,x}^{start,\mu}$ is as shown in Table 2.

TABLE 2

| | | | |
|---|---|---|---|
| SCS-SpecificCarrier ::= | SEQUENCE { | | |
| offsetToCarrier | INTEGER (0..2199), | | |
| subcarrierSpacing | SubcarrierSpacing, | | |
| carrierBandwidth | INTEGER (1..maxNrofPhysicalResourceBlocks), | | |
| ..., | | | |
| [[ | | | |
| txDirectCurrentLocation | INTEGER (0..4095) | OPTIONAL | -- Need S |
| ]] | | | |
| } | | | |

Here, Point A is a value that provides a common reference point for the resource block grid. In the case of PCell downlink, the UE may obtain Point A through the higher layer parameter 'offsetToPointA' and, in all other cases, obtain Point A through the absolute radio frequency channel number (ARFCN) set by the higher layer parameter 'absoluteFrequencyPointA.' Here, 'offsetToPointA' is a frequency offset between Point A and the lowest subcarrier of the RB with the lowest frequency among the RBs overlapping the synchronization signal/physical broadcast channel (SS/PBCH) selected or used by the UE in the initial cell selection process and is represented in RB units. The number or index of the common resource block (CRB) is incremented by one from 0 in the direction in which the value increases in the frequency domain. In this case, the center of the subcarrier index 0 of the common resource block for subcarrier spacing μ matches Point A. The frequency domain common resource block index ($n_{CRB}^{\mu}$ and the RE of the subcarrier spacing μ has the relationship $n_{CRB}^{\mu}=\lfloor k/N_{sc}^{RB}\rfloor$. Here, k is a value defined relative to Point A. In other words, k=0 is Point A.

The physical resource block (PRB) of the subcarrier spacing μ is defined as a number or index from 0 to $N_{BWP,i}^{size,\mu}-1$ within the bandwidth part (BWP). Here, i is the number or index of the bandwidth part. The relationship between PRB ($n_{PRB}^{\mu}$) and CRB($n_{CRB}^{\mu}$) in bandwidth part i is $n_{CRB}^{\mu}={}_{PRB}^{\mu}+N_{BWP,i}^{start,\mu}$. Here, $N_{BWP,i}^{start,\mu}$ is the number of CRBs from CRB 0 to the first RB where bandwidth part i starts.

<BWP>

A configuration of a bandwidth part in a 5G communication system is described below in detail with reference to the drawings.

Figure 7:
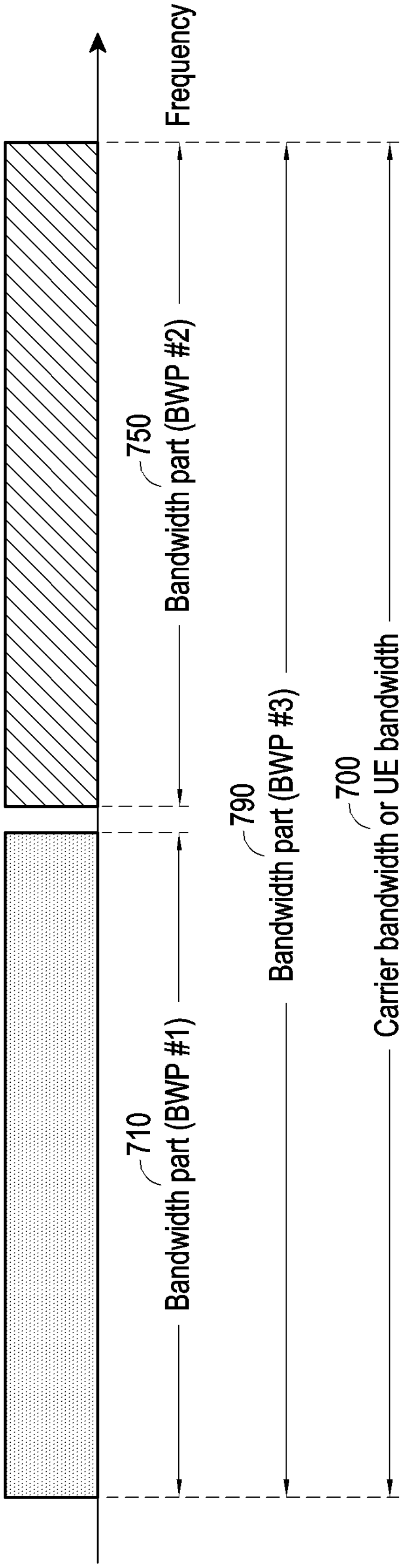
FIG. 7 is a view illustrating a bandwidth part of a 5G communication system.

FIG. 7 is a view illustrating an example of a configuration for a bandwidth part in a 5G communication system.

Referring to FIG. 7, a plurality of bandwidth parts, i.e., bandwidth part #1 (BWP #1) 710, bandwidth part #2 (BWP #2) 750, and bandwidth part #3 (BWP #3) 790 may be configured in the carrier bandwidth or UE bandwidth 700. Bandwidth part #3 790 occupies the entire UE bandwidth 700. Bandwidth part #1 710 and bandwidth part #2 750 may occupy the lower half and upper half, respectively, of the UE bandwidth 700.

The base station may configure one or more bandwidth parts in uplink or downlink to the UE. For each bandwidth part, one or more of the following upper layer parameters may be set. In this case, the setting for the bandwidth part may be independent for uplink and downlink. An example of the higher layer signaling information element BWP is shown in Table 3.

TABLE 3

| | |
|---|---|
| BWP ::= | SEQUENCE { |
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

In Table 3, 'bwp-Id' means the bandwidth part identifier, 'locationAndBandwidth' indicates the frequency domain location and bandwidth of the bandwidth part, 'subcarrier- Spacing' indicates the subcarrier spacing used in the bandwidth part, and 'cyclicPrefix' indicates whether extended cyclic prefix (CP) or a normal CP is used within the bandwidth part. Other various bandwidth part-related parameters than the foregoing parameters may be configured to the UE. The parameters may be transferred from the base station to the UE through higher layer signaling, e.g., RRC signaling. Within a given time, at least one bandwidth part among one or more configured bandwidth parts may be activated. An instruction to active the configured bandwidth part may be transferred from the base station to the UE semi-statically through RRC signaling or dynamically through the downlink control information (DCI) used for scheduling the physical downlink shared channel (PDSCH) or physical uplink shared channel (PUSCH).

According to an embodiment, before RRC connection, the UE may be configured with an initial bandwidth part (BWP) for initial access by the base station via a master information block (MIB). More specifically, the UE may receive configuration information about the search space and control resource set (CORESET) in which the physical downlink control channel (PDCCH) may be transmitted through the MIB in the initial access phase. In this case, each of the control resource set and search space configured through the MIB may be regarded as an identifier (or identity (ID) 0. The base station may provide the UE with at least one or more pieces of information among the frequency allocation information, time allocation information, and numerology for control resource set #0 through the MIB. Here, the numerology may include at least one of the subcarrier spacing or CP. Here, CP may mean at least one of the length of the CP or information corresponding to the CP length (e.g., normal or extended).

Further, the base station may provide the UE with configuration information for occasion and monitoring period for control resource set #0, i.e., configuration information for search space #0, via the MIB. The UE may regard the frequency domain set as control resource set #0 obtained from the MIB, as the initial BWP for initial access. In this case, the identity (ID) of the initial BWP may be regarded as 0.

The configuration of the bandwidth part supported in 5G described above may be used for various purposes.

According to an embodiment, when the bandwidth supported by the UE is smaller than the system bandwidth, data transmission/reception by the UE for the system bandwidth may be supported through bandwidth part configuration. For example, the base station may configure the frequency domain position of the bandwidth part in the UE to allow the UE to transmit/receive data in a specific frequency position in the system bandwidth.

According to an embodiment, for the purpose of supporting different numerologies, the base station may configure the UE with a plurality of bandwidth parts. For example, to support data transmission/reception using a subcarrier spacing of 15 kHz and a subcarrier spacing of 30 kHz for some UE, the base station may configure the UE with two bandwidths, as subcarrier spacings of 15 kHz and 30 kHz. The different bandwidth parts may be frequency division multiplexed and, when transmitting/receiving data at a specific subcarrier spacing, the bandwidth part set as the specific subcarrier spacing may be activated.

According to an embodiment, for the purpose of reducing power consumption of the UE, the base station may configure the UE with bandwidth parts having different sizes of bandwidths. For example, when the UE supports a bandwidth exceeding a very large bandwidth, e.g., a bandwidth of 100 MHz, and always transmits/receives data using the bandwidth, significant power consumption may occur. In particular, it is very inefficient in terms of power consumption to monitor an unnecessary downlink control channel using a large bandwidth of 100 MHz in a situation where there is no traffic. For the purpose of reducing power consumption of the UE, the base station may configure a bandwidth part of a relatively small bandwidth to the UE, e.g., a bandwidth part of 20 Mhz, in the UE. In a no-traffic situation, the UE may perform monitoring in the 20 MHz bandwidth and, if data occurs, the UE may transmit/receive data in the 100 MHz bandwidth according to an instruction from the base station.

As described above, UEs before RRC connected may receive configuration information for the initial bandwidth part via MIB in the initial access phase. More specifically, the UE may be configured with a control resource set (CORESET) for the PDCCH from the MIB of the PBCH. The bandwidth of the control resource set configured through the MIB may be regarded as the initial downlink bandwidth part, and the UE may receive the physical downlink shared channel (PDSCH), which transmits the SIB, via the configured initial bandwidth part. Specifically, the UE may detect the PDCCH on the search space and the control resource set in the initial bandwidth part configured with the MIB, receive remaining system information (RMSI) or system information block (SIB)1 necessary for initial access through the PDSCH scheduled by the PDCCH, and obtain configuration information regarding the uplink initial bandwidth part through the SIB1 (or RMSI). The initial bandwidth part may be utilized for other system information (OSI), paging, and random access as well as for receiving SIB.

If the UE is configured with one or more bandwidth parts, the base station may indicate, to the UE, a change in bandwidth part using the bandwidth part indicator in the DCI.

As an example, when the currently activated bandwidth part of the UE is bandwidth part #1 710 in FIG. 7, the base station may indicate, to the UE, bandwidth part #2 750 with the bandwidth part indicator in the DCI, and the UE may change the bandwidth part to bandwidth part #2 750, based on the bandwidth part indicator in the received DCI.

As described above, since DCI-based bandwidth part changing may be indicated by the DCI scheduling PDSCH or PUSCH, the UE, if receiving a bandwidth part change request, is supposed to be able to receive or transmit the PDSCH or PUSCH, scheduled by the DCI, in the changed bandwidth part without trouble. To that end, the standard specified requirements for delay time $T_{BWP}$ required upon changing bandwidth part, which may be defined as shown in Table 4 below.

TABLE 4

| | | BWP switch delay $T_{BMP}$ (slots) | |
|---|---|---|---|
| μ | NR Slot length (ms) | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 17 |

*Note 1*

Depends on UE capability.

Note 2:

If the BWP switch involves changing of SCS, the BWP switch delay is determined by the larger one between the SCS before BWP switch and the SCS after BWP switch.

The requirement for delay of bandwidth part change supports type 1 or type 2 according to the capability of the UE. The UE may report a supportable bandwidth part delay time type to the base station. If the UE receives, in slot n, DCI including a bandwidth part change indicator according to the above-described requirements for bandwidth part change delay time, the UE may complete a change to the new bandwidth part, indicated by the bandwidth part change indicator, at a time not later than slot $n+T_{BWP}$, and may perform transmission/reception on the data channel scheduled by the DCI in the changed, new bandwidth part. Upon scheduling data channel in the new bandwidth part, the base station may determine time domain resource allocation for data channel considering the UE's bandwidth part change delay time $T_{BWP}$. In other words, in determining the time domain resource allocation for a data channel when scheduling data channel with the new bandwidth part, the base station may schedule a time after the bandwidth part change delay time, for the data channel. Thus, the UE may not expect that the DCI indicating the bandwidth part change indicates a slot offset (K0 or K2) smaller than the bandwidth part change delay time $T_{BWP}$.

If the UE has received the DCI (e.g., DCI format 1_1 or 0_1) indicating the bandwidth part change, the UE may perform no transmission or reception during the time period from the third symbol of the slot in which the PDCCH including the DCI has been received to the start symbol of the slot indicated by the slot offset (K0 or K2) indicated by the time domain resource allocation field in the DCI. For example, if the UE receives the DCI indicating a bandwidth part change in slot n, and the slot offset value indicated by the DCI is K, the UE may perform no transmission or reception from the third symbol of slot n to a symbol before a previous symbol of slot n+K (i.e., the last symbol of slot n+K−1).

Next, the SS/PBCH block in 5G is described below.

The SS/PBCH block may mean a physical layer channel block composed of primary SS (PSS), secondary SS (SSS), and PBCH. Details are as follows.

PSS: A signal that serves as a reference for downlink time/frequency synchronization and provides part of the information for cell ID SSS: serves as a reference for downlink time/frequency synchronization, and provides the rest of the information for cell ID, which PSS does not provide. Additionally, it may serve as a reference signal (RS) for demodulation of PBCH.

PBCH: provides essential system information necessary for transmitting and receiving the data channel and control channel by the UE. The essential system information may include search space-related control information indicating radio resource mapping information for a control channel or scheduling control information for a separate data channel for transmitting system information.

SS/PBCH block: The SS/PBCH block is composed of a combination of PSS, SSS, and PBCH. One or more SS/PBCH blocks may be transmitted within 5 ms, and each transmitted SS/PBCH block may be distinguished with an index.

The UE may detect the PSS and SSS in the initial access phase and may decode the PBCH. The UE may obtain the MIB from the PBCH and may be therefrom configured with control resource set #0 (which may correspond to a control resource set having a control resource set index of 0). The UE may perform monitoring on control resource set #0, assuming that the selected SS/PBCH block (or SS/PBCH block succeeding in PBCH decoding) and the demodulation reference signal (DMRS) transmitted in control resource set #0 are quasi-co-located (QCLed). The UE may obtain system information through the downlink control information transmitted in control resource set #0. The UE may obtain configuration information related to random access channel (RACH) required for initial access from the obtained system information. The UE may transmit the physical RACH (PRACH) to the base station considering the selected SS/PBCH index, and the base station receiving the PRACH may obtain the SS/PBCH block index selected by the UE. The base station may know which block the UE has selected from the SS/PBCH blocks and monitors control resource set #0 related thereto.

<DCI>

Next, downlink control information (DCI) in the 5G system is described below in detail.

In the 5G system, scheduling information for uplink data (or PUSCH) or downlink data (or PDSCH) is transferred from the base station to the UE through the DCI. The UE may attempt to monitor or detect at least one of the DCI format for fallback and the DCI format for non-fallback for the PUSCH or PDSCH. The fallback DCI format may be composed of fields predetermined between the base station and the UE, and the non-fallback DCI format may include configurable fields.

DCI may be transmitted through the PDCCH, which is a physical downlink control channel, via channel coding and modulation. A cyclic redundancy check (CRC) is added to the payload of the DCI, and the CRC is scrambled with the radio network temporary identifier (RNTI) that is the identity of the UE. Different RNTIs may be used for the purposes of the DCI, e.g., UE-specific data transmission, power control command, or random access response. In other words, the RNTI is not explicitly transmitted, but the RNTI is included in the CRC calculation process and transmitted. Upon receiving the DCI transmitted on the PDCCH, the UE may check the CRC using the allocated RNTI, and when the result of the CRC check is correct, the UE may be aware that the DCI has been transmitted to the UE.

For example, DCI scheduling a PDSCH for system information (SI) may be scrambled to SI-RNTI. The DCI scheduling a PDSCH for a random access response (RAR) message may be scrambled to RA-RNTI. DCI scheduling a PDSCH for a paging message may be scrambled with P-RNTI. The DCI providing a slot format indicator (SFI) may be scrambled to SFI-RNTI. The DCI providing transmit power control (TPC) may be scrambled to TPC-RNTI. The DCI for scheduling a UE-specific PDSCH or PUSCH may be scrambled with cell RNTI (C-RNTI).

DCI format 0_0 may be used as fallback DCI for scheduling PUSCH, and in this case, CRC may be scrambled with at least one of C-RNTI, CS-RNTI, or MCS-C-RNTI. DCI format 0_0 having a CRC scrambled with at least one RNTI among C-RNTI, configured scheduling (CS)-RNTI, and modulation coding scheme (MCS)-C-RNTI may include, e.g., at least one of the following information.

Identifier for DCI formats): An identifier for identifying DCI formats. For example, the UE receiving the DCI through the one-bit identifier may identify that the DCI has a UL DCI format (e.g., DCI format 0_1) when the identifier value is 0 and that the DCI has a DL DCI format (e.g., DCI format 1_0) when the identifier value is 1.

Frequency domain resource assignment: DCI format 0_0 supports only resource assignment type 1 scheme and includes $\lceil \log_2(N_{RB}^{UL,BWP}(N_{RB}^{UL,BWP}+1)/2) \rceil$ bits indicating the RBs which are frequency domain resources allocated in the resource allocation type 1 scheme. Here, when the UE monitors DCI format 0_0 in the common search space, $N_{RB}^{UL,BWP}$ is the size of the initial uplink bandwidth part, and when the UE monitors DCI format 0_0 in the UE-specific search space, $N_{RB}^{UL,BWP}$ is the size of the currently active uplink bandwidth part. In other words, the bandwidth part for determining the size of the frequency domain resource allocation field may be different depending on the search space in which the fallback DCI format is transmitted.

In an embodiment, when performing PUSCH hopping, among $\lceil \log_2(N_{RB}^{UL,BWP}(N_{RB}^{UL,BWP}+1)/2) \rceil$ bits, $N_{UL\_hop}$ most significant bits (MSBs) may be used to indicate the frequency offset. Here, if $N_{UL\_hop}=1$, it means that two offsets are set by higher layer signaling and, if $N_{UL\_hop}=2$, it means that four offsets are set by higher layer signaling, and $\lceil \log_2(N_{RB}^{UL,BWP}(N_{RB}^{UL,BWP}+1)/2 \rceil - N_{UL\_hop}$ bits indicate the frequency domain resource region allocated according to resource allocation type 1 below.

According to an embodiment, when PUSCH hopping is not performed, $\lceil \log_2(N_{RB}^{UL,BWP}(N_{RB}^{UL,BWP}+1)/2 \rceil$ bits provide the frequency domain resource region allocated according to resource allocation type 1.

Time domain resource assignment: 4 bits, indicating the row index of the time domain resource allocation table including the PUSCH mapping type, PUSCH transmission slot offset, PUSCH start symbol, and number of PUSCH transmission symbols. The time domain resource allocation table may be configured by higher layer signaling or pre-configured between the base station and the UE.

Frequency hopping flag: 1 bit, indicating whether PUSCH hopping is performed (enable) or PUSCH hopping is not performed (disable).

Modulation and coding scheme (MCS): indicates the modulation and coding scheme used for data transmission.

New data indicator: indicates whether HARQ initial transmission or retransmission.

Redundancy version (RV): indicates the redundancy version of HARQ.

HARQ process number: indicates the process number of HARQ.

TPC command: indicates a transmit power control command for the scheduled PUSCH.

Padding bit: A field for matching different DCI formats (e.g., DCI format 1_0) and sizes (total number of bits) and, as necessary, inserted as 0.

UL/SUL indicator: One bit. If the cell has two or more ULs, and the size of DCI format 1_0 before the padding bit is added is larger than the size of DCI format 0_0 before the padding bit is added, the UL/SUL indicator has one bit, otherwise the UL/SUL indicator is absent or is 0 bits. If the UL/SUL indicator exists, the UL/SUL indicator is positioned in the last bit of DCI format 0_0 after the padding bit.

ChannelAccess-CPext: Two bits, indicating the channel access type and CP extension in the cell operating in the unlicensed band. In the case of the cell operating in the licensed band, it does not exist or is 0 bits.

For DCI formats other than DCI format 0_0, refer to the 3GPP standardization document.

<Time Domain Resource Allocation>

A time domain resource allocation for the data channel in the 5G communication system is described below.

The base station may configure a table for time domain resource allocations for downlink data channel (PDSCH) and uplink data channel (PUSCH) to the UE through higher layer signaling (e.g., RRC signaling) or, like Table 5, a table for time domain resource allocations pre-defined between the base station and the UE may be used.

For example, in the case of fallback DCI, the UE may use a pre-defined table as shown in Table 5 and, in the case of non-fallback DCI, the UE may use a table configured through higher layer signaling.

TABLE 5

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

In this case, for the time domain resource allocation configured through higher layer signaling, for PDSCH, a table including up to maxNrofDL-Allocations=16 entries may be configured and, for PUSCH, a table including up to maxNrofUL-Allocations=16 entries may be configured. Each table may include at least one of, e.g., PDCCH-to-PDSCH slot timing (which is designated $K_0$ and corresponds to the time interval between the time of reception of the PDCCH and the time of transmission of the PDSCH scheduled by the received PDCCH) or PDCCH-to-PUSCH slot timing (which is designated $K_2$ and corresponds to the time interval between the time of PDCCH and the time of transmission of the PUSCH scheduled by the received PDCCH), the position S of the start symbol where the PDSCH or PUSCH is scheduled in the slot and the length L of the allocated symbols, and the mapping type of PDSCH or PUSCH. When higher layer signaling is used, information elements, e.g., as shown in Table 6 below may be provided from the base station to the UE.

TABLE 6

```
PDSCH-TimeDomainResourceAllocationList information element
PDSCH-TimeDomainResourceAllocationList ::=      SEQUENCE (SIZE(1..maxNrofDL-Allocations)) OF
PDSCH-TimeDomainResourceAllocation
PDSCH-TimeDomainResourceAllocation ::=        SEQUENCE {
   k0      INTEGER(0..32)                          OPTIONAL,   -- Need S
mappingType                                    ENUMERATED {typeA, typeB},
startSymbolAndLength                           INTEGER (0..127)
}
PUSCH-TimeDomainResourceAllocation information element
PUSCH-TimeDomainResourceAllocationList ::=      SEQUENCE (SIZE(1..maxNrofUL-Allocations)) OF
```

TABLE 6-continued

```
PUSCH-TimeDomainResourceAllocation
PUSCH-TimeDomainResourceAllocation ::=        SEQUENCE {
  k2       INTEGER(0..32)                        OPTIONAL,   -- Need S
mappingType                                   ENUMERATED {typeA, typeB},
  startSymbolAndLength                          INTEGER (0..127)}
```

Here, 'k0' is the offset in the unit of slot and indicates the PDCCH-to-PDSCH timing, 'k2' is the offset in the unit of slot and indicates the PDCCH-to-PUSCH timing, 'mapping-Type' indicates the mapping type of the PDSCH or PUSCH, and 'startSymbolAndLength' indicates the start symbol and length of the PDSCH or PUSCH. The base station may notify the UE of one of the entries of the time domain resource allocation table through L1 signaling. For example, it may be indicated with the 'time domain resource allocation' field in the DCI. The UE may obtain the time domain resource allocation for the PDSCH or PUSCH based on the fields in the DCI received from the base station.

<Frequency Domain Resource Allocation>

A frequency domain resource allocation for the data channel in the 5G communication system is described below.

As a method for indicating a frequency domain resource allocation for downlink data channel (PDSCH) and uplink data channel (PUSCH), two types, i.e., resource allocation type 0 and resource allocation type 1, are supported.

Resource allocation type 0 is a method for allocating a resource in units of resource block groups (RBGs) constituted of P contiguous RBs and may be notified of in the form of a bitmap from the base station to the UE. In this case, the RBG may be composed of a set of contiguous virtual RBs (VRBs), and the size P of the RBG (normal RBG size P) may be determined based on a value set as the higher layer parameter 'rbg-Size' and the bandwidth part size defined in Table 7 below.

TABLE 7

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

Here, the total number ($N_{RBG}$) of RBGs in bandwidth part i with a size of $N_{BPW,i}^{size}$ is $N_{RBG}=\lceil(NN_{BPW,i}^{size}+N_{BWP,i}^{start} \bmod P))/P\rceil$. Here, the size of the first RBG is $RBG_0^{size}=P-NN_{BPW,i}^{start} \bmod P$. The size $RBG_{last}^{size}$ of the last RBG is $RBG_0^{size}=(NN_{BPW,i}^{start}+NN_{BPW,i}^{size}) \bmod P$ if $(N_{BPW,i}^{start}+N_{BPW,i}^{size}) \bmod P>0$, otherwise $RGB_{last}^{size}$ is P. The size of the RBGs other than the RBG is P.—Each bit in the bitmap with a size of $N_{RBG}$ bits may correspond to its respective RBG. The RBGs may be indexed in ascending order of frequency, starting from the position of lowest position of the bandwidth part. For $N_{RBG}$ RBGs in the bandwidth part, RBG #0 to RBG #($N_{RBG}-1$) may be mapped to the most significant bit (MSB) to the least significant bit (LSB) of the RBG bitmap. When a specific bit value in the bitmap is 1, the UE may determine that an RBG corresponding to the bit value has been assigned and, when the specific bit value in the bitmap is 0, the UE may determine that no RBG is assigned corresponding to the bit value.

Resource allocation type 1 is a method for allocating a resource with the start position and length for contiguously allocated VRBs and, in this case, interleaving or non-interleaving may be additionally applied to the contiguously allocated VRBs. The resource allocation field of resource allocation field type 1 may be configured with a resource indication value (RIV), and the RIV may be composed of the start position ($RB_{start}$) of the VRBs and the length ($L_{RBs}$) of the contiguously allocated RBs. $RB_{start}$ may be the first PRB index at which resource allocation starts, and $L_{RBs}$ may be the length or number of contiguous PRBs allocated. Specifically, the RIV in the bandwidth part of the $N_{BWP}^{size}$ size may be defined as below.

$$\text{If } (L_{RBs}-1) \le \left\lfloor \frac{N_{BWP}^{size}}{2} \right\rfloor \text{ then } RIV = N_{BWP}^{size}(L_{RBs}-1)+RB_{start}$$

$$\text{Else, } RIV = N_{BWP}^{size}(N_{BWP}^{size}-L_{RBs}-1)+(N_{BWP}^{size}-1-RB_{start})$$

where, $L_{RBs} \ge 1$ and shall not exeed $N_{BWP}^{size} - RB_{start}$.

In this case, $N_{BWP}^{size}$ may vary depending on the search space in which the fallback DCI format (e.g., DCI format 0_0 or DCI format 1_0) is transmitted. For example, when the fallback DCI format, DCI format 0_0, of the DCI (i.e., uplink (UL) grant configuring or scheduling uplink transmission is transmitted in the common search space (CSS), as $N_{BWP}^{size}$, the initial uplink bandwidth part size, $N_{BWP,0}^{size}$ or $N_{BWP}^{initial}$, may be used. Similarly, when the fallback DCI format, DCI format 1_0, of the DCI configuring or scheduling downlink reception is transmitted in the common search space (CSS), size $N_{BWP}^{size}$ and/or $N_{BWP}^{initial}$ is the size of control resource set #0 if control resource set #0 is configured in the cell and is the size of the initial downlink bandwidth part if control resource set #0 is not configured.

In this case, when the fallback DCI format, i.e., DCI format 0_0 or DCI format 1_0, is transmitted in the UE-specific search space (USS) or the size of the fallback DCI format transmitted in the UE-specific search space is determined through the size of the initial uplink bandwidth part or initial downlink bandwidth part, but the DCI is applied to another active bandwidth part with a size of $N_{BPW}^{active}$ the RIV may correspond to $RB_{start}$=0, K, 2K, . . . , ($N_{BWP}^{initial}$–1)K and $L_{RBs}$=K, 2K, . . . , $N_{BWP}^{initial}$K, and the RIV may be defined as follows.

$$\text{If } (L'_{RBs}-1) \le \lfloor N_{BWP}^{initial}/2 \rfloor \text{ then } RIV = N_{BWP}^{initial}(L'_{RBs}-1)+RB'_{start}$$

$$\text{Else, } RIV = N_{BWP}^{initial}(N_{BWP}^{initial}-L'_{RBs}-1)+(N_{BWP}^{initial}-1-RB'_{start})$$

where, $L'_{RBs}=L_{RBs}/K, RB'_{start}=RB_{start}/K$, $L'_{RBs}$ shall not exceed $N_{BWP}-RB'_{start}$ In this case, if $N_{BWP}^{active} > N_{BWP}^{initial}$, then K is the largest value meeting $K \le \lfloor N_{BWP}^{active}/N_{BWP}^{initial} \rfloor$ of set {1,2,4,8}. Otherwise($N_{BWP}^{active} \le N_{BWP}^{initial}$), K is 1.

The base station may configure the resource allocation type to the UE through higher layer signaling. For example, the upper layer parameter resourceAllocation may be set to one of resourceAllocationtype0, resourceAllocationtype1, or dynamicSwitch. If the UE is configured with both resource allocation types 0 and 1 or if the higher layer parameter resourceAllocation is set to dynamicSwitch, it may be indicated whether the most significant bit (MSB) of the resource allocation field in the DCI format indicating scheduling is resource allocation type 0 or resource allocation type 1, resource allocation information may be indicated via the remaining bits except for the bit corresponding to the MSB based on the indicated resource allocation type and, based thereupon, the UE may interpret the resource allocation information for the DCI. If the UE is configured with either resource allocation type 0 or resource allocation type 1 or if the higher layer parameter resourceAllocation is set to either resourceAllocationType0 or resourceAllocationType1, the resource allocation field in the DCI format indicating scheduling may indicate the resource allocation information based on the configured resource allocation type, and the UE may interpret the resource allocation information for the DCI based on the configured resource allocation type.

<CORESET>

A downlink control channel in the 5G communication system is described below in greater detail with reference to the drawings.

Figure 8:
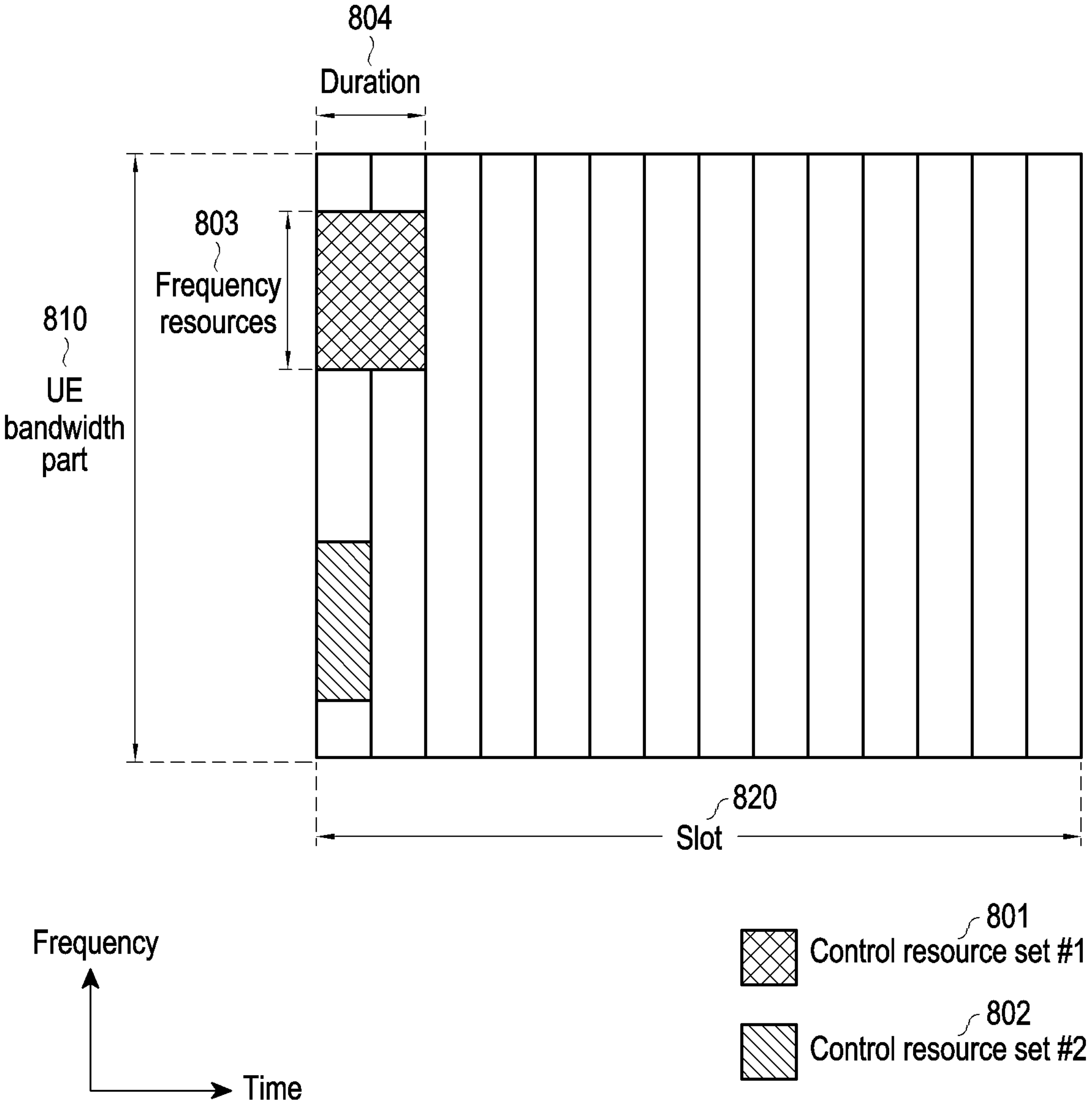
FIG. 8 is a view illustrating an example of a control resource set configuration for a downlink control channel of a 5G communication system.

FIG. 8 is a view illustrating an example of a control resource set configuration for a downlink control channel of a 5G communication system. In other words, FIG. 8 is a view illustrating an example of a control resource set (CORESET) where the download control channel is transmitted in the 5G wireless communication system.

Referring to FIG. 8, two control resource sets, i.e., control resource set #1 801 and control resource set #2 802, are configured in in the UE bandwidth part 810 in the frequency domain and in one slot 820 in the time domain. The control resource sets 801 and 802 may be configured in a specific frequency resource 803 in the UE bandwidth part 810 in the frequency domain and be configured as one or more OFDM symbols in the time domain. The OFDM symbols may be defined as the control resource set length (control resource set duration) 804. In the shown example, control resource set #1 801 may be configured as a control resource set length of two symbols, and control resource set #2 802 may be configured as a control resource set length of one symbol.

Each control resource set described above may be configured to the UE by the base station through higher layer signaling, e.g., at least one of system information, master information block (MIB), or radio resource control (RRC) signaling. Configuring a UE with a control resource set means providing the UE with such information as the identifier (ID) of the control resource set, the frequency position of the control resource set, and symbol length of the control resource set. For example, the higher layer signaling information elements to configure the control resource set may include information as shown in Table 8.

TABLE 8

```
ControlResourceSet ::=                SEQUENCE {
  controlResourceSetId                  ControlResourceSetId,
  frequencyDomainResources              BIT STRING (SIZE (45)),
  duration                              INTEGER (1..maxCoReSetDuration),
  cce-REG-MappingType                   CHOICE {
      interleaved                           SEQUENCE {
         reg-BundleSize                       ENUMERATED (n2, n3, n6},
         interleaverSize                      ENUMERATED (n2, n3, n6},
            shiftIndex                           INTEGER(0..maxNrofPhysicalResourceBlocks-1)
               OPTIONAL -- Need S
      },
      nonInterleaved                        NULL
  },
  precoderGranularity               ENUMERATED {sameAsREG-bundle, allContiguousRBs},
    tci-StatesPDCCH-ToAddList               SEQUENCE(SIZE (1..maxNrofTCI-StatesPDCCH)) OF TCI-
StateId OPTIONAL, -- Cond NotSIB1-initialBWP
    tci-StatesPDCCH-ToReleaseList           SEQUENCE(SIZE (1..maxNrofTCI-StatesPDCCH)) OF TCI-
StateId OPTIONAL, -- Cond NotSIB1-initialBWP
  tci-Present InDCI                       ENUMERATED {enabled}  OPTIONAL, -- Need S
  pdcch-DMRS-ScramblingID                 INTEGER (0..65535)    OPTIONAL, -- Need S
  ...,
  [[
  rb-Offset-r16                           INTEGER (0..5)        OPTIONAL, -- Need N
  tci-PresentInDCI-ForDCI-Format1-2-r16   INTEGER (1..3)        OPTIONAL, -- Need S
  coresetPoolIndex-r16                    INTEGER (0..1)        OPTIONAL, -- Need R
  controlResourceSetId-r16            ControlResourceSetId-r16  OPTIONAL  -- Need S
  ]]
}
```

Here, 'controlResourceSetId' indicates the control resource set identity, 'frequencyDomainResources' indicates the frequency domain resource, 'duration' indicates the time range of the control resource set, i.e., the time domain resource, 'cce-REG-Mappingtype' indicates the CCE-to-REG mapping scheme, 'reg-BundleSize' indicates the REG bundle size, 'interleaverSize' indicates the interleaver size, and 'shiftIndex' indicates the interleaver shift. Further, tci-StatesPDCCH is configuration information about transmission configuration indication (TCI) states and may include one or more SS/PBCH block indexes or channel state information reference signal (CSI-RS) indexes having a quasi co-located (QCL) relationship with the DMRS transmitted in the corresponding control resource set.

Figure 9:
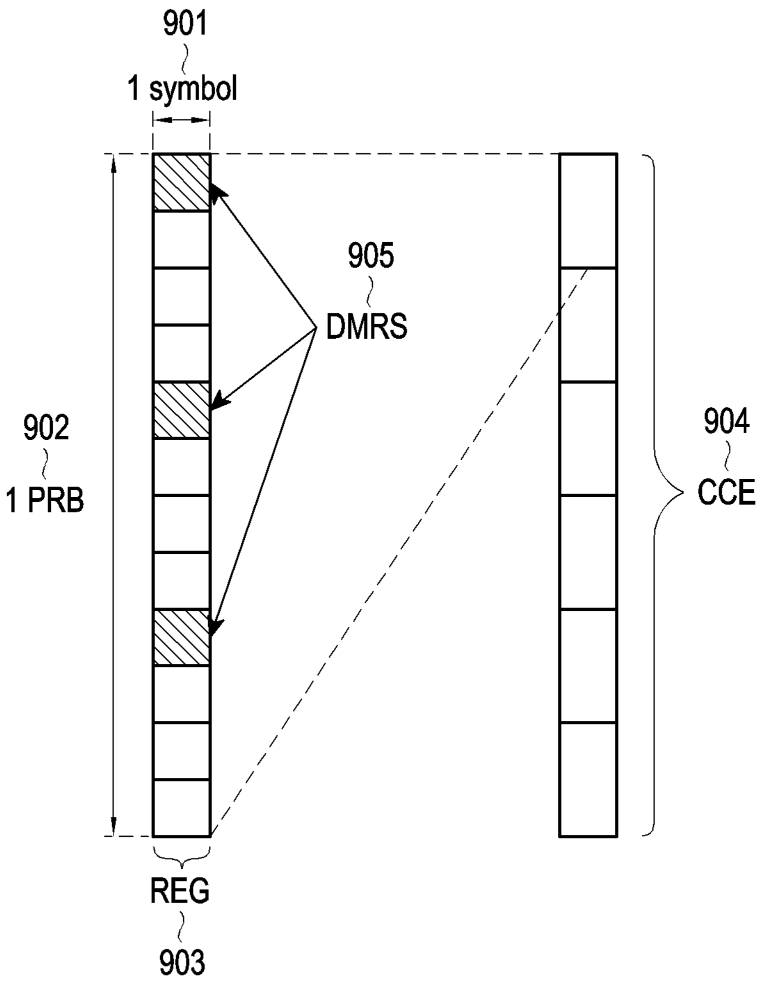
FIG. 9 is a view illustrating a structure of a downlink control channel of a 5G communication system.

FIG. 9 is a view illustrating a structure of a downlink control channel of a 5G communication system. In other words, FIG. 9 is a view illustrating an example of a basic unit of time and frequency resource constituting a download control channel available in a 5G wireless communication system.

Referring to FIG. 9, the basic unit of time and frequency resources constituting the downlink control channel may be referred to as a resource element group (REG) 903, and the REG 903 may be defined with one OFDM symbol 901 in the time domain and with one PRB 902, i.e., 12 subcarriers, in the frequency domain. The base station may configure a downlink control channel allocation unit by concatenating at least one REG 903.

In 5G, when the basic unit in which the downlink control channel is allocated is a control channel element (CCE) 904, one CCE 904 may be constituted of a plurality of REGs 903. In the example of the illustrated REG 903, the REG 903 may be constituted of 12 REs, and if one CCE 904 is constituted of six REGs 903, one CCE 904 may be constituted of 72 REs. The region where the downlink control resource set is configured may be constituted of a plurality of CCEs 904, and a specific downlink control channel may be mapped to one or more CCEs 904 according to the aggregation level (AL) in the control resource set. The CCEs 904 in the control resource set are distinguished with numbers, and in this case, the numbers of the CCEs 904 may be assigned according to a logical mapping scheme.

The basic unit of the downlink control channel, i.e., REG 903, may include both the region of the REs to which the DCI is mapped and the region where the DMRS 905 used to demodulate the DCI is mapped. At least one (three in the example shown in FIG. 9) DMRS 905 may be transmitted in one REG 903. The number of CCEs necessary to transmit a downlink control channel may be, e.g., 1, 2, 4, 8, or 16 depending on the aggregation level (AL), and different numbers of CCEs may be used to implement link adaptation of downlink control channel. For example, if AL=L, one downlink control channel may be transmitted via L CCEs. The UE needs to detect a signal in the control resource set while being unaware of the presence of downlink control channel and, for such blind decoding, a search space is defined which indicates a set of CCEs. The search space is a set of candidate control channels constituted of CCEs that the UE needs to attempt to decode on the given aggregation level, and since there are several aggregation levels to bundle up 1, 2, 4, 8, or 16 CCEs, the UE has a plurality of search spaces. The search space set (Set) may be defined as a set of search spaces in all configured aggregation levels.

<Search Space>

The search spaces for the PDCCH may be classified into a common search space (CSS) and a UE-specific search space (USS). A predetermined group of UEs or all the UEs may search for the common search space to receive cell-common control information, e.g., paging message, or dynamic scheduling for system information. For example, PDSCH scheduling allocation information for transmission of the SIB including cell service provider may be detected by inspecting the common search space. The common search space may be defined as a set of pre-agreed CCEs to allow a predetermined group of UEs or all the UEs to receive the PDCCH. Scheduling allocation information for the UE-specific PDSCH or PUSCH may be detected by inspecting the UE-specific search space. The UE-specific search space may be UE-specifically defined with a function of various system parameters and the identity of the UE.

In the 5G wireless communication system, the parameters for the search space of the PDCCH may be configured in the UE by the base station through higher layer signaling (e.g., SIB, MIB, or RRC signaling). For example, the base station may configure the UE with, e.g., the number of PDCCH candidates at each aggregation level L, monitoring period for search space, monitoring occasion of symbol unit in slot for search space, search space type (common search space or UE-specific search space), combination of RNTI and DCI format to be monitored in the search space, and control resource set index to be monitored in the search space. For example, the higher layer signaling information elements to configure the parameters for the search space of the PDCCH may include information as shown in Table 9.

TABLE 9

```
SearchSpace ::= SEQUENCE {
SearchSpace :=       SEQUENCE {
  searchSpaceId                    SearchSpaceId,
  controlResourceSetId             ControlResourceSetId OPTIONAL,   -- Cond SetupOnly
  monitoringSlotPeriodicityAndOffset                          CHOICE {
...
                                                                                  }
     OPTIONAL,   -- Cond Setup
  duration                           INTEGER (2..2559) OPTIONAL,   -- Need R
  monitoringSymbolsWithinSlot      BIT STRING (SIZE (14)) OPTIONAL,   -- Cond Setup
  nrofCandidates                                              SEQUENCE {
     aggregationLevel1             ENUMERATED {n0, n1, n2, n3, n4, n5, n6, n8},
     aggregationLevel2             ENUMERATED {n0, n1, n2, n3, n4, n5, n6, n8},
     aggregationLevel4             ENUMERATED {n0, n1, n2, n3, n4, n5, n6, n8},
     aggregationLevel8             ENUMERATED {n0, n1, n2, n3, n4, n5, n6, n8},
     aggregationLevel16            ENUMERATED {n0, n1, n2, n3, n4, n5, n6, n8}
                                                                                  }
     OPTIONAL,   -- Cond Setup
  searchSpaceType                                             CHOICE {
     common                                                      SEQUENCE {
...
     },
     ue-Specific                                                    SEQUENCE {
...
     }
                                                                                  }
     OPTIONAL    -- Cond Setup2
}
```

Here, 'searchSpaceId' indicates the search space identity, 'controlResourceSetId' indicates the control resource set identity, 'monitoringSlotPeriodicityAndOffset' indicates the monitoring slot level period, 'duration' indicates the length of the time range to be monitored, 'monitoringSymbolsWithinSlot' indicates the symbols for PDCCH monitoring in the slot, 'nrofCandidates' indicates the number of PDCCH candidate groups per aggregation level, 'searchSpaceType' indicates the search space type, 'common' includes parameters for the common search space, and 'ue-Specific' includes parameters for UE-specific search space. According to the configuration information, the base station may configure one or more search space sets to the UE. According to an embodiment, the base station may configure the UE with search space set 1 and search space set 2 and configure it to monitor DCI format A, scrambled to X-RNTI in search space set 1, in the common search space and to monitor DCI format B, scrambled to Y-RNTI in search space set 2, in the UE-specific search space.

According to the configuration information, one or more search space sets may exist in the common search space or the terminal-specific search space. For example, search space set #1 and search space set #2 may be configured in the common search space, and search space set #3 and search space set #4 may be configured in the UE-specific search space.

In the common search space, combinations of DCI formats and RNTIs as follows may be monitored. Of course, it is not limited to the examples described below.

- DCI format 0_0/1_0 with CRC scrambled by C-RNTI, CS-RNTI, SP-CSI-RNTI, RA-RNTI, TC-RNTI, P-RNTI, SI-RNTI
- DCI format 2_0 with CRC scrambled by SFI-RNTI
- DCI format 2_1 with CRC scrambled by INT-RNTI
- DCI format 2_2 with CRC scrambled by TPC-PUSCH-RNTI, TPC-PUCCH-RNTI
- DCI format 2_3 with CRC scrambled by TPC-SRS-RNTI In the UE-specific search space, combinations of DCI formats and RNTIs as follows may be monitored. Of course, it is not limited to the examples described below.

- DCI format 0_0/1_0 with CRC scrambled by C-RNTI, CS-RNTI, TC-RNTI
- DCI format 1_0/1_1 with CRC scrambled by C-RNTI, CS-RNTI, TC-RNTI The specified RNTIs may be defined and used as follows.

- C-RNTI (Cell RNTI): for scheduling UE-specific PDSCH
- Temporary cell RNTI (TC-RNTI): for scheduling UE-specific PDSCH
- Configured scheduling RNTI (CS-RNTI): for scheduling semi-statically configured UE-specific PDSCH
- Random access RNTI (RA-RNTI): for scheduling PDSCH in the random access phase
- Paging RNTI (P-RNTI): for scheduling PDSCH where paging is transmitted
- System information RNTI (SI-RNTI): for scheduling PDSCH where system information is transmitted
- Interruption RNTI (INT-RNTI): for indicating whether to puncture PDSCH
- Transmit power control for PUSCH RNTI (TPC-PUSCH-RNTI): for indicating power control command for PUSCH
- Transmit power control for PUCCH RNTI (TPC-PUCCH-RNTI): for indicating power control command for PUCCH
- Transmit power control for SRS RNTI (TPC-SRS-RNTI): for indicating power control command for sounding reference signal (SRS)

The above-described DCI formats may follow the definitions in Table 10 below.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G communication system, such as NR, physical channels and physical signals may be divided as follows. For example, an uplink/downlink physical channel means a set of REs for transferring information transmitted through a higher layer, and typically includes PDCCH, PUCCH, PDSCH, and PUSCH. The uplink/downlink physical signal means a signal used in the physical layer without transferring the information transmitted through a higher layer, and representatively includes DM-RS, CSI-RS, and SRS. In the disclosure, as described above, the physical channel and the physical signal may be referred to as a 'signal' without being distinguished from each other. For example, that the base station transmits a downlink signal may mean that the base station transmits at least one of a downlink physical channel and downlink physical signal, such as PDCCH, PDSCH, DM-RS, or CSI-RS. In other words, the term 'signal' in the disclosure includes at least one of channel and signal and, if necessary, they may be distinguished from each other according to the context.

<TCI State>

A method for configuring a TCI state for PDCCH (or PDCCH DMRS) in the 5G communication system is described below in detail.

The TCI state is to indicate a quasi co-location (QCL) relationship between a PDCCH (or PDCCH DMRS) and another reference signal (RS) or channel. Here, that antenna port A (reference RS #A) of a certain reference signal and antenna port B (target RS #B) of a target reference signal are QCLed means that the UE is allowed to apply all or some of channel-related parameters estimated at antenna port A in measuring the channel from antenna port B. QCL-related parameters may include at least one of 1) time tracking influenced by average delay and delay spread, 2) frequency tracking influenced by Doppler shift and Doppler spread, 3) radio resource management (RRM) influenced by average gain, and 4) beam management (BM) influenced by spatial parameter and, according to context, different parameters need to be associated. NR may support four types of QCL relationships as shown in Table 11 below.

TABLE 11

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

Here, spatial RX parameter may collectively refer to all or some of various parameters, such as Angle of arrival (AoA), Power Angular Spectrum (PAS) of AoA, Angle of departure (AoD), PAS of AoD, transmit/receive channel correlation, transmit/receive beamforming, spatial channel correlation.

The QCL relationship may be configured to the UE through the TCI-State and QCL-Info which are RRC signaling parameters as shown in Table 12 below. Referring to Table 12, the base station may configure the UE with one or more TCI states, indicating up to two QCL relationships (qcl-Type1 and qcl-Type2) for the RS referencing the ID of the TCI state, i.e., the target RS. Here, indicating up to two QCL relationships is merely an example, and the base station may indicate more than two QCL relationships for the target RS to the UE. In this case, the QCL information (QCL-Info) included in each TCI state may include the serving cell index and BWP index of the reference RS indicated by the QCL information, type and ID of the reference RS, and the QCL type as shown in Table 12 above.

TABLE 12

```
TCI-State ::=          SEQUENCE {
   tci-StateId            TCI-StateId,
   qcl-Type1              QCL-Info,
   qcl-Type2              QCL-Info             OPTIONAL,   -- Need R
   ...
}
QCL-Info ::=           SEQUENCE {
   cell                     ServCellIndex        OPTIONAL,   -- Need R
   bwp-Id                   BWP-Id   OPTIONAL, -- Cond CSI-RS-Indicated
   referenceSignal      CHOICE {
      csi-rs                NZP-CSI-RS-ResourceId.
      ssb                   SSB-Index
   },
   qcl-Type                 ENUMERATED {typeA, typeB, typeC, typeD},
   ...
}
```

Here, tci-StateId denotes the TCI state ID, qcl-Type1 includes the QCL information of the first target RS referencing the TCI state ID, and qcl-Type2 includes the QCL information of the second target RS referencing the TCI state ID. For each QCL information, 'cell' indicates the serving cell index of the UE configured with the RS indicated by the QCL information, 'bwp-Id' indicates the BWP index of the RS indicated by the QCL information, and 'csi-rs' or 'ssb' indicates the CSI-RS ID or synchronization signal/sequence block (SSB) ID indicated by the QCL information. The base station may perform communication with the UE using one or more beams. To that end, the base station may transfer information about N different beams to the UE through N different TCI states. For example, when N=3, the base station allows the qcl-Type parameter (e.g., qcl-Type2) included in three TCI states to be associated with CSI-RSs or SSBs corresponding to different beams and set to QCL type D, indicating, to the UE, that the antenna ports referencing the different TCI states are associated with different spatial Rx parameters, i.e., different beams.

Specifically, an example combination of TCI states applicable to the PDCCH DMRS antenna port is as shown in Table 13 below. In Table 13, the fourth row is a combination assumed by the UE before RRC configuration, and the row cannot be configured to the UE after the RRC configuration.

TABLE 13

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

The base station supports hierarchical signaling for dynamic TCI state allocation for PDCCH beams to the UE. Specifically, the base station may configure N TCI states (TCI #0, TCI #1, . . . , TCI #M−1) to the UE through RRC signaling and configure some of them as TCI states for CORESET. Thereafter, the base station may indicate and activate one of the TCI states for CORESET through MAC CE signaling (e.g., a MAC CE activation command for providing the TCI state of CORESET). The UE, receiving the MAC CE signaling, may apply the TCI state indicated by the MAC CE signaling from the first slot, $3 \cdot N_{slot}^{subframe,\mu}$ slots after the slot (e.g., slot k) where the HARQ-ACK information for the PDSCH providing the MAC CE signaling is transmitted and receive the PDCCH based on the beam information including the TCI state. Here, $N_{slot}^{subframe,\mu}$ is the number of slots included in each subframe for the subcarrier spacing μ.

In this case, the MAC CE for indicating the TCI state of the PDCCH may be constituted of 2 bytes (16 bits) and may include a 5-bit serving cell ID field, a 4-bit CORESET ID field, and a 7-bit TCI state ID field. The serving cell ID field may indicate the ID of the serving cell to which the MAC CE is applied, and the CORESET ID field may indicate the ID of the CORESET to which the MAC CE TCI state is indicated or applied. The TCI state ID field may indicate the TCI state applied to the CORESET identified through the CORESET ID field. If the CORESET ID is 0, the TCI state ID field may indicate one of the 64 TCI states from the first one of the TCI states configured through 'tci-States-ToAddModList' and 'tci-States-ToReleaseList' of 'PDSCH-Config', which is higher layer signaling for the activated bandwidth part. If the CORESET ID is set to a value other than 0, the TCI state ID field may indicate one of the TCI states configured through 'tci-StatesPDCCH-ToAddList' and 'tci-StatesPDCCH-ToReleaseList', which are higher layer signaling for the CORESET indicated by the CORESET ID field.

The UE, receiving the TCI-state indication and/or activation for the CORESET through MAC CE signaling, may consider that the same QCL information is applied to all of the one or more search spaces connected with the CORESET until before another TCI state is indicated through another MAC CE signaling.

<TCI State for Radio Link Monitoring (RLM)>

If the UE is not configured with, or does not receive, higher configuration information related to RLM-RS, but the TCI states configured or received by the UE for PDCCH reception include one or more CSI-RSs, the UE may operate as follows.

When the TCI state activated to receive PDCCH includes only one RS, the UE performs the RLM operation using the RS.

The UE need not perform RLM using an aperiodic RS or semi-persistent RS.

When $L_{max}=4$, the UE selects $N_{RLM}$ RSs from the one with the shortest PDCCH monitoring periodicity among the search spaces associated with the CORESET where the PDCCH is transmitted among the RSs of the TCI state activated and provided for PDCCH reception. When the search spaces for one or more CORESETs have the same PDCCH monitoring periodicity, the UE may determine the order of CORESET selection as order from the highest CORESET index.

The UE configured with a plurality of downlink bandwidth parts for the serving cell may perform RLM using the RS as follows. The RS is an RS corresponding to the RS index configured or provided through the higher layer signaling 'RadioLinkMonitoringRS' for the activated downlink bandwidth part or, if not configured or provided through the higher layer signaling 'RadioLinkMonitoringRS' for the activated downlink bandwidth part, the RS of the TCI state configured and activated to the CORESET for PDCCH reception in the activated downlink bandwidth part.

<TCI State for PDCCH Assignment>

The UE, receiving 'as the search space ID for the type 0/0A/2 PDCCH CS S set and C-RNTI, may determine the PDCCH monitoring occasion of the type 0/0A/2 PDCCH CSS set and monitor PDCCH candidates on the PDCCH monitoring occasion associated with the SS/PBCH block. Here, the SS/PBCH block may be determined according to at least one of the following.

- SS/PBCH block QCLed with the CSI-RS included in the TCI state indicated or activated with the MAC CE activation indicator in the activated bandwidth part including CORESET index 0, or
- SS/PBCH block used in the latest contention-based random access procedure performed The UE, not receiving the TCI state information indicating the QCL information of the DM-RS antenna port of the PDCCH transmitted in the CORESET, may assume that all of the DM-RS antenna port of the PDCCH transmitted in the CORESET configured by the configuration information transmitted through the MIB, the DM-RS antenna port of the PDSCH scheduled through the PDCCH, and the SS/PBCH block transmitting the MIB are QCLed by the average gain, QCL-TypeA, and QCL-TypeD characteristics.

For the CORESET having index 0, the UE may assume that the DM-RS antenna port of the PDCCH received in the CORESET is QCLed with the downlink RS or SS/PBCH block as follows. In other words, when the TCI state is indicated or activated by a MAC CE activation command for the CORESET, the UE may assume that one or more downlink RSs configured through the TCI state are QCLed with the DM-RS antenna port of the PDCCH. When not receiving the MAC CE activation command to indicate or activate the TCI state for the CORESET after the latest random access procedure among other random access procedures than the non-contention random access procedure triggered by a PDCCH order, the UE may assume that it is QCLed with the SS/PBCH block identified by the UE during the latest random access procedure.

When, for the other CORESETs than the CORESET having index 0, the UE does not receive configuration information of TCI state through the CORESET configuration information as shown in Table 8 or receives an initial configuration of a plurality of TCI states but does not receive a MAC CE activation command to indicate or activate one TCI state for the CORESET, the UE may assume that the DM-RS antenna port of the PDCCH received in the CORESET is QCLed with the SS/PBCH block identified in the initial access procedure.

When, for the other CORESETs than the CORESET having index 0, the UE receives configuration information of the TCI state through CORESET configuration information as shown in Table 8, as part of a reconfiguration with sync procedure, but does not receive a MAC CE activation command to indicate or activate one TCI state for the CORESET, the UE may assume that the DM-RS antenna port of the PDCCH received in the CORESET is QCLed with the CSI-RS or SS/PBCH block identified in the random access procedure initiated by the reconfiguration with sync procedure.

When, for the other CORESETs than the CORESET having index 0, the UE receives one TCI state for the CORESET or receives a MAC CE activation command to indicate or activate one TCI state for the CORESET, the UE may assume that the DM-RS antenna port of the PDCCH received in the CORESET is QCLed with one or more RSs configured through the TCI state.

For the CORESET having index 0, the UE may receive, from the SS/PBCH, the QCL-TypeD attribute of the CSI-RS configured through the TCI state indicated or activated through the MAC CE activation command.

The UE, receiving the MAC CE signaling, applies the TCI state indicated by the MAC CE signaling from the first slot, $3 \cdot N_{slot}^{subframe,\mu}$ slots after the slot (e.g., slot k) where the HARQ-ACK information for the PDSCH providing the MAC CE signaling is transmitted through the PUCCH and receives the PDCCH based on the beam information including the TCI state. Here, $N_{slot}^{subframe,\mu}$ is the number of slots included in each subframe for the subcarrier spacing μ.

<Slot Format Indicator (SFI)>

In the 5G communication system, a downlink signal transmission window and an uplink signal transmission window may be dynamically changed. To that end, the base station may indicate, to the UE through a slot format indicator (SFI), whether each OFDM symbol constituting one slot is a downlink symbol, an uplink symbol, or a flexible symbol. Here, the flexible symbol may mean a symbol that is neither the downlink symbol nor uplink symbol or may be changed into a downlink or uplink symbol by UE-specific control information or scheduling information. In this case, the flexible symbol may include a gap guard necessary in the process of switching from downlink to uplink.

The UE, receiving the slot format indicator, may perform the downlink signal reception operation from the base station in the symbol indicated as a downlink symbol and the uplink signal transmission operation from the base station in the symbol indicated as an uplink symbol. For the symbol indicated as a flexible symbol, the UE may perform, at least, the PDCCH monitoring operation and, through another indicator, e.g., DCI, the UE may perform the downlink signal reception operation from the base station in the flexible symbol (e.g., upon receiving DCI format 1_0 or 1_1) or perform the uplink signal transmission operation to the base station (e.g., DCI format 0_0 or 0_1).

Figure 10:
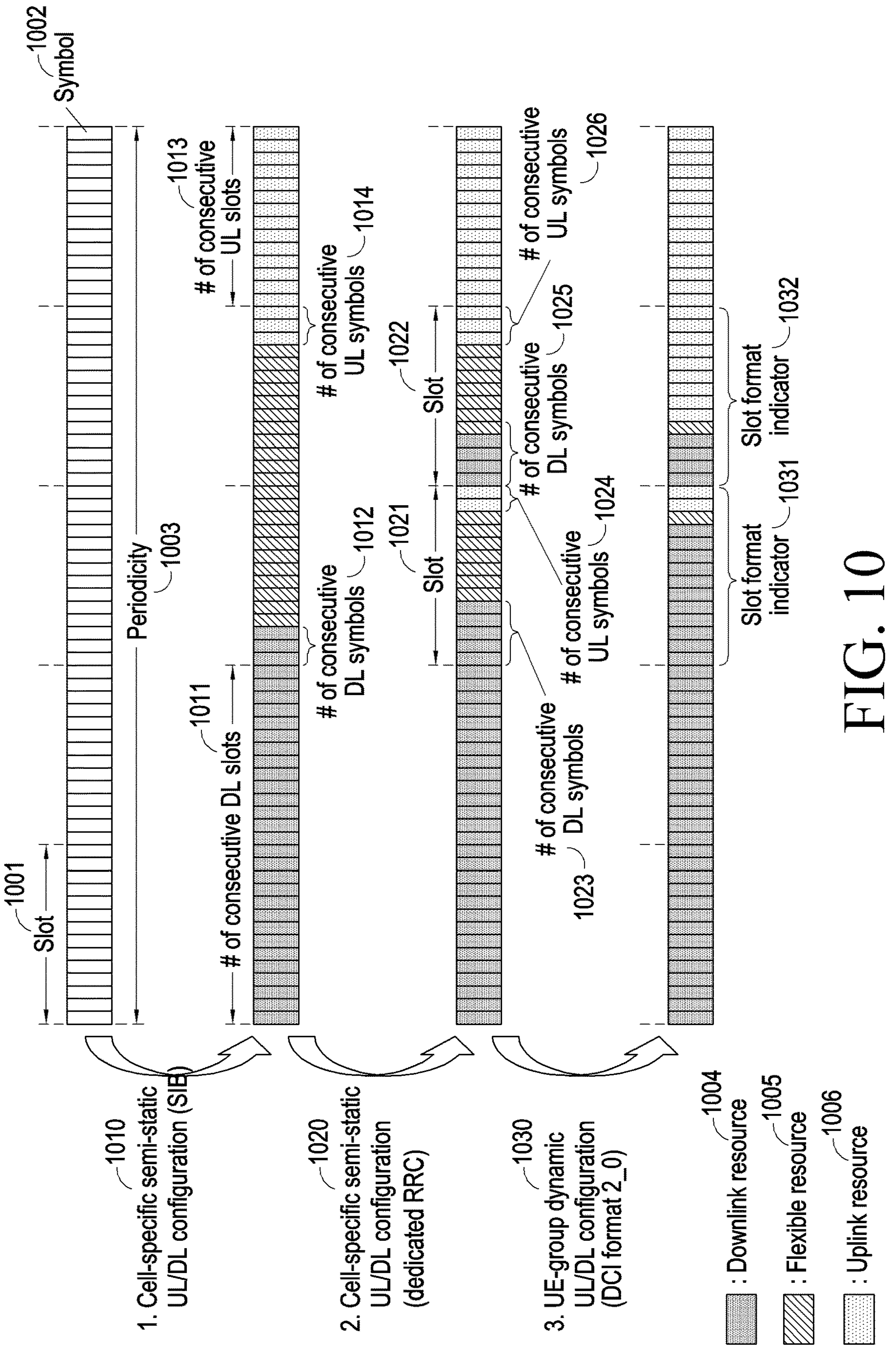
FIG. 10 is a view illustrating an example of an uplink-downlink configuration in the time domain in a 5G communication system.

FIG. 10 is a view illustrating an example of an UL-DL configuration (UL/DL configuration) in the 5G system, showing three steps of UL-DL configuration of symbol/slot.

Referring to FIG. 10, in the first step, cell-specific configuration information 1010, e.g., SIB or such system information, for configuring uplink-downlink semi-statically configures the uplink-downlink of symbol/slot. Specifically, the cell-specific uplink-downlink configuration information 1010 in the system information may include uplink-downlink pattern information and information indicating the reference subcarrier spacing. The uplink-downlink pattern information may indicate the transmission periodicity 1003 of each pattern, the number 1011 of consecutive full DL slots at the beginning of each DL-UL pattern, the number 1012 of consecutive DL symbols in the beginning of the slot following the last full DL slot, the number 1013 of consecutive full UL slots at the end of each DL-UL pattern, or the number 1014 of consecutive UL symbols in the end of the slot preceding the first full UL slot. In this case, the UE may determine that the slot/symbol not indicated as uplink or downlink may be a flexible slot/symbol.

In the second step, the UE-specific configuration information 1020 transferred through UE-dedicated higher layer signaling (i.e., RRC signaling) indicates symbols to be configured as downlink or uplink in the flexible slot or slots 1021 and 1022 including a flexible symbol. As an example, the UE-specific uplink-downlink configuration information 1020 may include the slot index indicating the slot 1021 and 1022 including the flexible symbol, the number of prosecutive DL symbols in the beginning of the slot 1023 and 1025, the number of consecutive UL symbols in the end of the slot 1024 and 1026, or information indicating the entire downlink for each slot or information indicating the entire uplink. In this case, the symbol/slot configured as uplink or downlink through the cell-specific configuration information 1010 in the first step cannot be changed into downlink or uplink through UE-specific higher layer signaling 1020.

Finally, to dynamically change the downlink signal transmission window and uplink signal transmission window, the downlink control information of the downlink control channel includes a slot format indicator 1030 indicating whether each symbol in each of a plurality of slots starting from the slot where the UE detects the downlink control information is a downlink symbol or an uplink symbol or a flexible symbol. In this case, for the symbol/slot configured as uplink or downlink in the first and second steps, the slot format indicator cannot indicate it as downlink or uplink. The slot format of each slot 1031 and 1032 including at least one symbol not configured as uplink or downlink in the first and second steps may be indicated by corresponding downlink control information.

The slot format indicator may indicate an uplink-downlink configuration for 14 symbols in one slot as shown in Table 14 below. The slot format indicator may be simultaneously transmitted to multiple UEs through a UE group (or cell) common control channel. In other words, downlink control information including the slot format indicator may be transmitted through an identifier, e.g., PDCCH CRC-scrambled with SFI-RNTI, different from the UE-specific C-RNTI (cell-RNTI). The downlink control information may include a slot format indicator for one or more slots, i.e., N slots. Here, N may be an integer larger than 0 or may be a value set through higher layer signaling from the base station by the UE form a set of possible values previously defined. The size of the slot format indicator may be set to the UE through higher layer signaling by the base station.

TABLE 14

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |

TABLE 14-continued

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

In Table 14, D means the downlink symbol, U means the uplink symbol, and F means the flexible symbol. According to Table 14, the total number of slot formats supportable for one slot is 256. In the NR system, the maximum bit size of information bits available to indicate the slot format is 128 bits and may be set to the UE by the base station through higher layer signaling, e.g., 'dci-PayloadSize.'

In this case, the cell operating in the unlicensed band may adopt one or more additional slot formats or modify at least one or more of existing slot formats, thereby configuring and indicating additional slot formats as shown in Table 15. Table 15 shows an example of additional slot formats in which one slot is constituted only of uplink symbols and flexible symbols F.

TABLE 15

| For- | Symbol number (or index) in one slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 56 | F | U | U | U | U | U | U | U | U | U | U | U | U | U |
| 57 | F | F | U | U | U | U | U | U | U | U | U | U | U | U |
| 58 | U | U | U | U | U | U | U | U | U | U | U | U | U | F |
| 59 | U | U | U | U | U | U | U | U | U | U | U | U | F | F |
| . . . | | | | | | | | | | | | | | |

In an embodiment, downlink control information used for indicating the slot format may indicate slot format(s) for a plurality of serving cells, and the slot format(s) for each serving cell may be identified through the serving cell ID. Further, a slot format combination for one or more slots for each serving cell may be indicated by the downlink control information. For example, when the size of one slot format indicator index field in the downlink control information is 3 bits and indicates the slot format for one serving cell, the 3-bit slot format indicator index field may indicate eight slot formats (or slot format combinations) in total, and the base station may indicate the slot format indicator index field through UE group common downlink control information. In an embodiment, at least one slot format indicator index field included in the downlink control information may be configured as a slot format combination indicator for a plurality of slots. For example, Table 16 shows a 3-bit slot format combination indicator constituted of the slot formats of Table 14 and Table 15. Among the values of the slot format combination indicator, {0, 1, 2, 3, 4} indicate a slot format for one slot. The remaining three values {5, 6, 7} indicate a slot format for four slots, and the UE may apply the indicated slot format to four slots sequentially from the slot where the downlink control information including the slot format combination indicator is detected.

TABLE 16

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

<XDD>

The 5G wireless communication system, e.g., NR system, generally uses a higher center frequency than the LTE system, and resultantly reduces in communication service coverage between base station and UE and thus requires coverage enhancement. In particular, to support services in which the transmit power of the UE is generally lower than the transmit power of the base station, and downlink traffic has a higher proportion, uplink coverage enhancement is critical in the time division duplexing (TDD) system in which the downlink proportion in the time domain is typically higher than that of uplink. As methods for physically enhancing uplink channel coverage between base station and UE, it may be considered to increase uplink time resources, decrease the center frequency of the uplink carrier, use a lower center frequency, or increase UE transmit power. However, changing frequencies may be restricted because the frequency band is determined for each network operator. Further, increasing the maximum UE transmit power is also restricted as the maximum allowable transmit power is limited by per-area or per-frequency band regulations to reduce interference.

Thus, to enhance the coverage of base station and UE, a system may be required which is allowed to have increased uplink time resources by dividing the uplink resources and downlink resources in the frequency domain, like the FDD system, rather than dividing uplink and downlink proportions only in the time domain depending on the traffic proportions of uplink and downlink, in the TDD system. In the disclosure, the system in which the uplink resources and downlink resources may be flexibly divided and used in the time domain and/or frequency domain is defined as an XDD system. In this case, in XDD, 'X' may mean time and/or frequency. Further, the XDD system may also be referred to as at least one or more of an enhanced TDD system, a flexible TDD system, a hybrid TDD system, a TDD-FDD system, a hybrid TDD-FDD system, a full duplex system, or a hybrid division duplex (HDD) system. In the disclosure, for convenience of description, it is referred to as XDD system.

Figure 11:
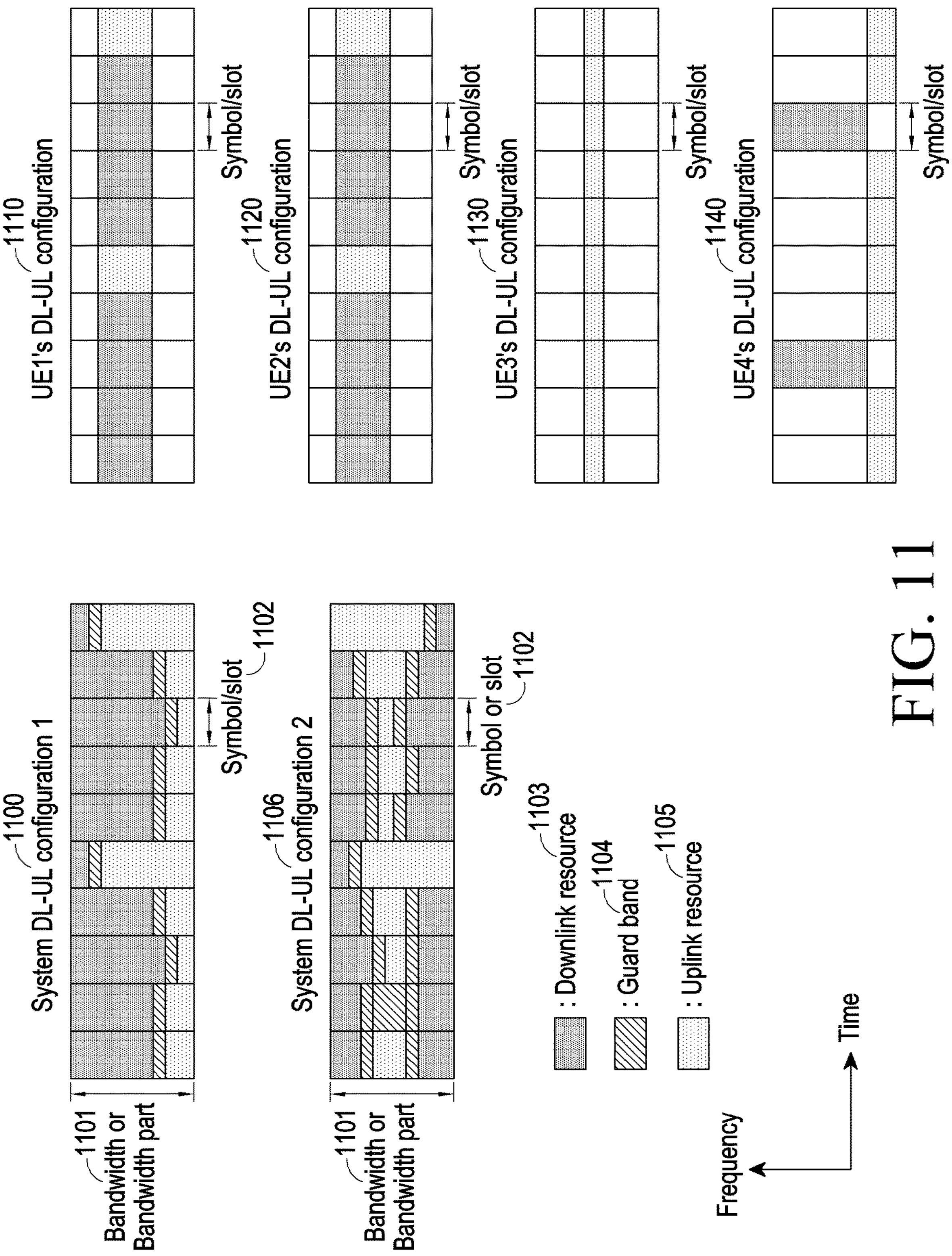
FIG. 11 is a view illustrating an example of an uplink-downlink configuration in the frequency domain in a 5G communication system.

FIG. 11 is a view illustrating an uplink-downlink configuration of an XDD system in which the uplink resource and downlink resource are flexibly divided in the time domain and the frequency domain according to an embodiment of the disclosure. The time domain of FIG. 11 may have one or more symbols or one or more slots as the unit.

Referring to the embodiments shown on the left side of FIG. 11, from a base station perspective, in the uplink-downlink configuration 1100 of the entire XDD system, for the entire frequency band 1101, the uplink resource 1105 and the downlink resource 1103 may be flexibly allocated per symbol or slot 1102 depending on the uplink and downlink traffic proportions. In this case, a guard band 1104 and/or flexible resource may be allocated between the downlink resource 1103 and the uplink resource 1105 in the frequency band. In other words, the guard band 1104 and/or flexible resource may be allocated to reduce interference by uplink channel or signal reception due to out-of-band emissions or unwanted emissions caused when the base station transmits the downlink channel or signal in the downlink resource 1103. In the embodiments shown on the right side of FIG. 11, UE1 1110 and UE2 1120 which have more traffic on downlink than on uplink may be allocated downlink and uplink resources in the ratio of 4:1 in the time domain by the configuration of the base station. FIG. 11 illustrates that UE3 1130 which is located at the cell boundary and is insufficient for uplink coverage is allocated only uplink resources in some time ranges by the configuration of the base station. Additionally, UE4 1140 which operates at the cell boundary and is thus insufficient for uplink coverage but has relatively much downlink and uplink traffic may be allocated more uplink resources in the time domain for uplink coverage and be allocated more downlink resources in the frequency band.

More downlink resources in the time domain may be allocated to UEs which operate relatively in the center of the cell, and more uplink resources in the time domain may be allocated to UEs which operate relatively at the cell boundary and have insufficient uplink coverage, thereby extending uplink coverage. In this case, the XDD system may have the advantage of being capable of more flexibly allocating uplink and downlink transmission/reception resources in the time and frequency domain depending on the traffic proportions of uplink and downlink, as well as extending the uplink coverage. For example, the XDD system may also be used when providing a URLLC service requiring minimized uplink transmission latency or requiring simultaneous uplink and downlink transmission/reception like in the integrated access and backhaul (IAB) system or relay.

In the disclosure, there are provided an uplink-downlink resource configuration method in the time domain and frequency domain and a channel and signal transmission/reception method and device according thereto, in an XDD system capable of flexibly allocating uplink and downlink resources in the time and/or frequency domain. The disclosure also proposes an uplink-downlink transmission/reception method and device of a base station and UE under the assumption of an XDD system. However, the disclosure is not limited as applied only to the XDD system but may rather be applicable to uplink-downlink transmission/reception methods and devices of base station and UE in other division duplex systems or full duplex systems that may be provided in the 5G system.

Embodiments of the disclosure relate to a method and device for configuring resources for uplink or downlink transmission/reception in the frequency domain in a bandwidth or a bandwidth part in the XDD system. According to an embodiment of the disclosure, through a method for configuring a resource for uplink or downlink transmission/reception, the UE may be configured with at least one of an uplink resource capable of uplink transmission in the frequency domain in a bandwidth or bandwidth part for a specific time (symbol units or slot units), a downlink resource capable of downlink reception, or a flexible resource capable of uplink transmission or downlink reception.

Further, unlike the TDD system which is only capable of resource configuration for uplink or downlink transmission/reception only in the time domain, the XDD system may divide or separately configure resources for uplink and downlink transmission/reception not only in the time domain but also in the frequency domain. In this case, if uplink and downlink resources are together configured in a bandwidth or bandwidth part, interference may occur due to at least one of interference between uplink and downlink transmission and reception, out-of-band emissions, or unwanted emissions, and thus, a guard band may be needed between the uplink and downlink resources. In the disclosure, the guard band is specified by a frequency range and, according to an embodiment, may include a guard period in which the guard band is specified by a time range. In an embodiment of the disclosure, the guard band may be previously defined or be selected from among a plurality of frequency bands configured through higher layer signaling. According to an embodiment of the disclosure, through a method for configuring resources for uplink or downlink transmission and reception, the UE may be configured with one or more guard bands between the uplink and downlink resources in the bandwidth or bandwidth part in the frequency domain in a specific time (symbol units or slot units). In other words, the UE may configure or determine one or more resource block sets using the configured guard band. In the disclosure, the resource block set may include one or more resource blocks and, according to an embodiment, may be constituted of smaller units (e.g., resource elements) than the resource blocks. The operation of configuring or determining one or more resource block sets using the configured guard band by the UE is described with reference to FIG. 12.

To minimize or remove influence by interference that may arise during uplink and downlink transmission/reception, the UE supporting the XDD system may be configured with one or more in-cell guard bands for the cell or carrier through a higher layer signal from the base station or may configure an in-cell guard band using a pre-defined guard band. In this case, the in-cell guard band may be configured independently or equally for each of the downlink cell or carrier and the uplink cell or carrier.

Meanwhile, for convenience of description, in various embodiments of the disclosure, it is assumed that the UE is configured with a guard band for each cell, but the UE may be configured with the guard band per bandwidth part, as well as per cell or carrier.

Figure 12:
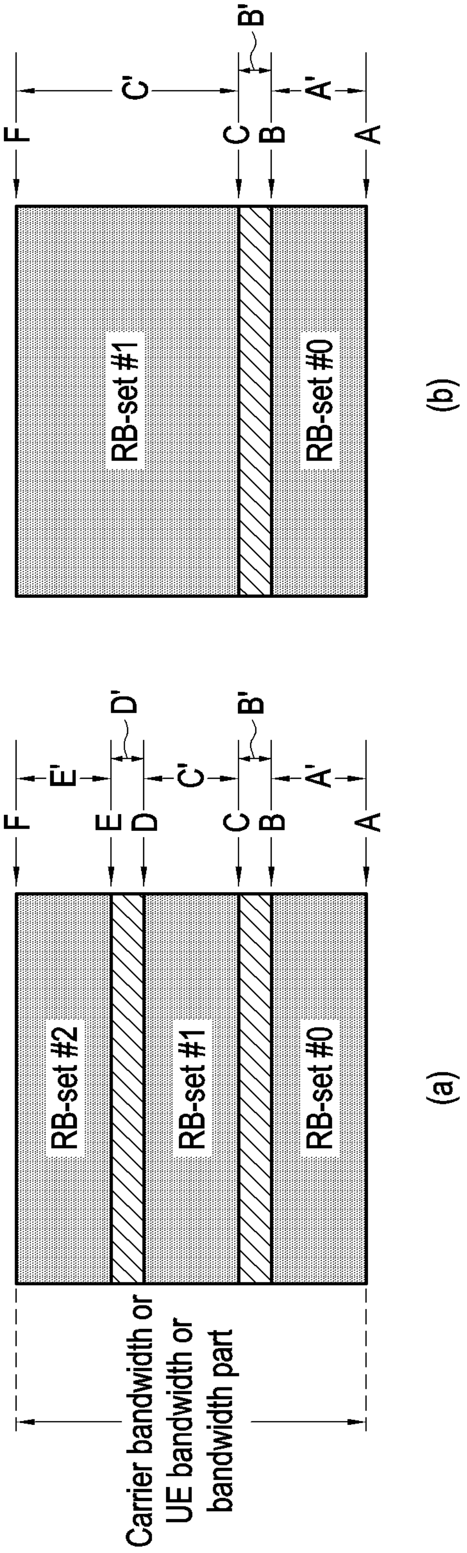
FIG. 12 is a view illustrating an example of a guard band and resource block set configuration in a wireless communication system according to an embodiment of the disclosure.

FIG. 12 (including part (a) and part (b)) illustrates an example in which one or more in-cell guard bands are configured in the cell supporting XDD or carrier bandwidth or UE bandwidth or bandwidth part using XDD. FIG. 12 part (a) illustrates an example in which three resource block sets (RB-sets) are configured in the carrier bandwidth, UE bandwidth, or bandwidth part, and FIG. 12 part (b) illustrates an example in which two resource block sets (RB-sets) are configured in the carrier bandwidth, UE bandwidth, or bandwidth part.

The UE may be configured with $N_{RB\text{-}set,x}-1$ guard bands in the cell or carrier through higher layer signaling. Here, x=DL or UL, and DL means the downlink cell or carrier, and UL means the uplink cell or carrier. Table 17 is an example of higher layer signaling. The higher layer signaling may include, e.g., UL-DL-GuardBand.

TABLE 17

```
UL-DL-GuardBand ::= SEQUENCE (SIZE (1..X0)) OF GuardBand
GuardBand :: = SEQUENCE {
   startCRB                    INTEGER (0..X1),
   nrofCRBs                    INTEGER (0..X2)
}
```

In Table 17, startCRB is the index $GB_{s,x}^{start,\mu}$ of the start CRB of the in-cell guard band as in B or D of FIG. 12, and nrofCRBs is the length or size $GB_{s,x}^{size,\mu}$ of the in-cell guard band as in B' or D' of FIG. 12. startCRB and nrofCRBs may be expressed as the number N of CRBs or the number N of PRBs. In this case, B' and D' may be the same as or different from each other. In Table 17, examples of X0, X1, and X2 may be 4, 274, and 15. Meanwhile, nrofCRBs may be a value indicating the index $GB_{s,x}^{end,\mu}$ of the last CRB in the in-cell guard band as in C or E of FIG. 12. If nrofCRBs is 0, it may mean either that no guard band exists in the cell or that the size of the guard band is 0. The GuardBand information may include one or more values (startCRB, nrofCRBs) values. The first value of every two values is the lowest CRB index $GB_{s,x}^{start,\mu}$ of the in-cell guard band, and the second value may mean the length or size $GB_{s,x}^{size,\mu}$ of the in-cell guard band. Here, the CRB index may be replaced with the PRB index.

According to an embodiment of the disclosure, the UE may determine the number (e.g., $N_{RB\text{-}set,x}-1$) of the uplink/downlink in-cell guard bands configured from the base station using the sequence length (e.g., sequence length/2) of the UL-DL-GuardBand information or the number of information (startCRB, nrofCRBs) about the CRBs included in the UL-DL-GuardBand information. The UE may determine the number (e.g., $N_{RB\text{-}set,x}$) of resource block sets according to the determined number of in-cell guard bands.

As described above, the UE configured with the in-cell guard band may divide the resource region except for the in-cell guard band in the bandwidth or bandwidth part into $N_{RB\text{-}set}$ resource block sets (RB-sets) or resource regions and perform uplink/downlink transmission/reception using the resources included in each resource block set. In this case, the frequency resource region of each resource block set may be determined as follows.

The first or start CRB index ('A' in FIG. 12 part (a) and 'A' in FIG. 12 part (b)) of the first resource block set (e.g., resource block set index 0): $RB_{0,x}^{start,\mu}=N_{grid,x}^{start,\mu}$ The last or end CRB index ('B' in FIG. 12 part (a) and 'B' in FIG. 12 part (b)) of the first resource block set: $RB_{0,x}^{end,\mu}=N_{grid,x}^{start,\mu}+GB_{0,x}^{start,\mu}-1$ The first or start CRB index ('E' in FIG. 12 part (a) and 'C' in FIG. 12 part (b)) of the last resource block set (e.g., resource block set index $N_{RS\text{-}set\text{-}1}$): $RB_{N_{RB\text{-}set\text{-}1},x}^{start,\mu}=N_{grid,x}^{start,\mu}+GB_{N_{RB\text{-}set\text{-}2},x}^{start,\mu}+GB_{N_{RB\text{-}set\text{-}2},x}^{start,\mu}$ The last or end CRB index ('F' in FIGS. 12 part (a) and 12 part (b)) of the last resource block set: $RB_{N_{RB\text{-}set\text{-}1},x}^{start,\mu}=N_{grid,x}^{start,\mu}+N_{grid,x}^{size,\mu}-1$ The first or start CRB index ('C' in FIG. 12 part (a)) of one or more resource block sets between the first resource block set and the last resource block set:

$$RB_{s+1,x}^{start,\mu}=N_{grid,x}^{start,\mu}+GB_{s,x}^{start,\mu}+GB_{s,x}^{size,\mu}$$

The last or end CRB index ('D' in FIG. 12 part (a)) of one or more resource block sets between the first resource block set and the last resource block set:

$$RB_{s,x}^{end,\mu}=N_{grid,x}^{start,\mu}+GB_{s,x}^{start,\mu}-1$$

In this case, the resource block set s may be constituted of $RB_{s,x}^{size,\mu}$ RBs, where $RB_{s,x}^{size,\mu}=RB_{s,x}^{end,\mu}-RB_{s,x}^{start,\mu}$. Further, s=0, 1, . . . , $N_{RB\text{-}set,x}-1$, and $N_{grid,x}^{start,\mu}$ and $N_{grid,x}^{size,\mu}$ may be configured, through a higher layer signal, with the first RB and bandwidth available to the carrier according to the subcarrier spacing configuration μ.

If the UE is configured with a guard band size of 0 for the entire guard band in a certain time range, the UE may determine that no guard band is present in the cell or carrier in the corresponding time range.

If the UE is not configured with an in-cell guard band through higher layer signaling (UL-DL-GuardBand), the UE may determine the frequency resource region of resource block set(s) and the in-cell guard band using the resource block set pattern and the in-cell guard band previously defined with the base station. The resource block set pattern may have various numbers of resource block sets and guard bands in the DL bandwidth part as shown in, e.g., FIG. 13 (including parts (a), (b), and (c)). In this case, the in-cell guard band and resource block set pattern may be predefined according to the subcarrier spacing and carrier or bandwidth part size. Further, the in-cell guard band may be predefined independently for downlink and uplink or configured through a higher layer signal, and at least one of the location or size of the downlink in-cell guard band may be the same as or different from at least one of the location or size of the uplink in-cell guard band. Here, that the in-cell guard band is predefined may mean that, for each in-cell guard band, at least one of the first or start CRB index $GB_{s,x}^{start,\mu}$ of the in-cell guard band, the size $GB_{s,x}^{size,\mu}$ of the in-cell guard band, or the last or end CRB index $GB_{s,x}^{end,\mu}$ is predefined.

In this case, for the cell or carrier, the UE may determine that $N_{BWP,i}^{start,\mu}=RB_{s0,x}^{start,\mu}$ and $N_{BWP,i}^{size,\mu}=RB_{s1,x}^{end,\mu}-RB_{s0,x}^{start,\mu}+1$ for uplink or downlink bandwidth part i.

Here, $0 \leq s0 \leq s1 \leq N_{RB-set,x}-1$. In bandwidth part i, the resource block set indexes of the resource block sets may be determined in ascending order from 0 to $N_{RB-set,x}^{BWP}$. Here, $N_{RB-set,x}^{BWP}$ is the number of resource block sets included in bandwidth part i. According to an embodiment of the disclosure, RBset #0 of bandwidth $N_{RB-set,x}^{BWP}-1$ of part i may correspond to RBset #s0 of the cell or carrier, and RBset #$N_{RB-set,x}^{BWP}$ of bandwidth part i may correspond to RBset #s1 of the cell or carrier.

In this case, the UE may be configured with whether each determined resource block set is a resource block set for downlink or a resource block set for uplink, through a higher layer signal. In this case, the UE may be configured as the resource block set being a flexible resource block set which may be a downlink or uplink resource block set, through a higher layer signal. In other words, the UE may be configured with whether the frequency domain resource is a resource for uplink, a resource for downlink, or a flexible resource through a higher layer signal, and an example of the higher layer signal is as shown in Table 18.

TABLE 18

```
XDD-UL-DL-Configuration ::= SEQUENCE (SIZE (1..X3)) OF
RBset-UL-DL
RBset-UL-DL ::=   ENUMERATED {downlink, uplink, flexible}
```

In other words, the UE may be configured with whether each resource block set is a resource block set for downlink (hereinafter, downlink resource block set), a resource block set for uplink (hereinafter, uplink resource block set), or a flexible resource block set (hereinafter, flexible resource block set) which may be a downlink or uplink resource block set, by the base station, for $N_{RB-set,x}$ or $N_{RB-set,x}^{BWP}$ resource block sets, through the XDD-UL-DL-Configuration. In the example of FIG. 12 part (a), RBset #0 may be configured as a downlink resource block set, RBset #1 as a flexible resource block set (or uplink resource block set), and RBset #2 as a downlink resource block set. In the example of FIG. 12 part (b), RBset #0 may be configured as a flexible resource block set (or uplink resource block set), and RBset #1 as a downlink resource block set. In this case, the UE may be configured with a resource block set through a higher layer signal for each of uplink and downlink cell or carrier or bandwidth part. For example, for the uplink cell or carrier or bandwidth part, the resource block set may be configured through XDD-UL-DL-Configuration or XDD-UL-DL-Configuration-UL and, for the downlink cell or carrier or bandwidth part, the resource block set may be configured through XDD-UL-DL-Configuration or XDD-UL-DL-Configuration-DL. In this case, the higher layer signals are merely an example, and other signals may be used. Further, the information about the XDD-UL-DL-Configuration may be configured to the UE through UL-DL-GuardBand.

If XDD-UL-DL-Configuration is not configured or provided, the UE may determine that $N_{RB-set,x}$ or $N_{RB-set,x}^{BWP}$ resource block sets all are flexible resource block sets. In this case, for the downlink bandwidth or downlink bandwidth part, the UE may determine that $N_{RB-set,DL}$ or $N_{RB-set,UL}^{BWP}$ resource block sets all are downlink resource block sets and, for the uplink bandwidth or uplink bandwidth part, the UE may determine that $N_{RB-set,UL}$ or $N_{RB-set,UL}^{BWP}$ resource block sets all are uplink resource block sets.

Figure 13:
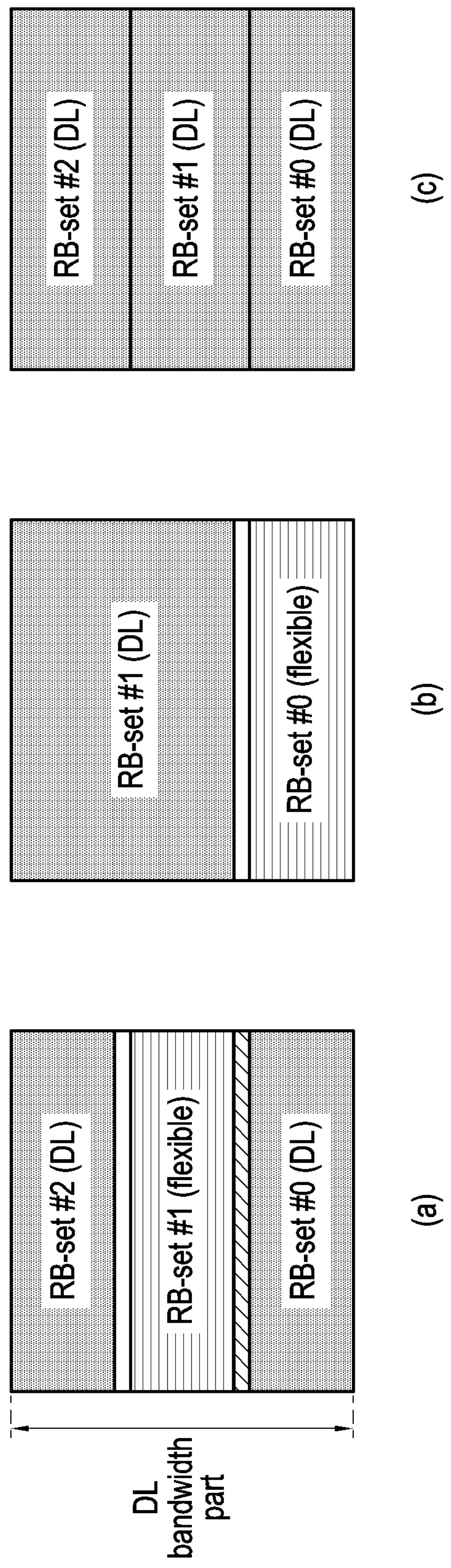
FIG. 13 is a view illustrating an example of a frequency domain resource block set configuration of a downlink bandwidth part in a wireless communication system according to an embodiment of the disclosure.

FIG. 13 is a view illustrating examples of frequency domain resource block set configurations of a UE configured with two or three resource block sets for a downlink bandwidth part.

As shown in FIG. 13 part (a), according to an embodiment of the disclosure, the UE may be configured with RBset #0 and RBset #2 being downlink resource block sets through a higher signal (XDD-UL-DL-Configuration) and as RBset #1 being a flexible resource block set. Alternatively, as shown in FIG. 13 part (c), RBset #0, RBset #1, and RBset #2 may all be configured as downlink resource block sets through a higher layer signal (XDD-UL-DL-Configuration). As shown in FIG. 13 part (b), the UE may be configured with two resource block sets for the downlink bandwidth part and, through the higher signal (XDD-UL-DL-Configuration), be configured with RBset #1 being a downlink resource block set and as RBset #0 being a flexible resource block set. Meanwhile, FIG. 13 merely illustrates examples of resource block set configurations for the downlink bandwidth part, and other applications are also possible.

Figure 14:
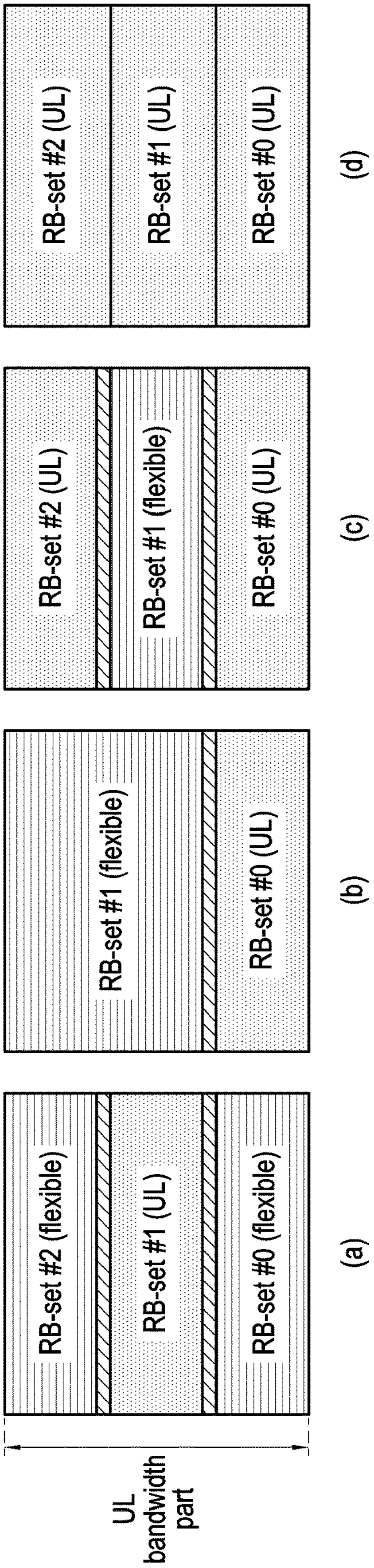
FIG. 14 is a view illustrating an example of a frequency domain resource block set configuration of an uplink bandwidth part in a wireless communication system according to an embodiment of the disclosure.

FIG. 14 (including parts (a), (b), (c), and (d)) is a view illustrating an example of a frequency domain resource block set configuration of a UE configured with two or three resource block sets in an uplink bandwidth part.

As shown in FIG. 14 part (a), the UE configured with three resource block sets divided for the uplink bandwidth part may be configured with RBset #0 and RBset #2 being flexible resource block sets and RBset #1 being an uplink resource block set through the higher signal (XDD-UL-DL-Configuration) according to an embodiment of the disclosure.

As shown in FIG. 14 part (b), the UE configured with two resource block sets divided for the uplink bandwidth part may be configured with RBset #1 being a flexible resource block set and RBset #0 being an uplink resource block set through the higher signal (XDD-UL-DL-Configuration) according to an embodiment of the disclosure.

As shown in FIG. 14 part (c), the UE configured with three resource block sets divided for the uplink bandwidth part may be configured with RBset #0 and RBset #2 being uplink resource block sets and RBset #1 being a flexible resource block set through the higher signal (XDD-UL-DL-Configuration) according to an embodiment of the disclosure. Or, as shown in FIG. 14 part (d), the UE configured with three resource block sets divided for the uplink bandwidth part may determine that RBset #0, RBset #1, and RBset #2 all are uplink resource block sets or that RBset #0, RBset #1, and RBset #2 all are uplink resource block sets by a separate explicit signal. Meanwhile, FIG. 14 merely illustrates examples of resource block set configurations for the uplink bandwidth part, and other applications are also possible.

FIGS. 13 and 14 illustrate examples in which the UE is explicitly configured with each resource block set type through a signal from the base station. In contrast, the UE may also determine the type of each resource block set using information about one or more guard bands configured. For example, in relation to one resource block set between two guard bands, the UE may determine whether the resource block set is one of the uplink resource block set, downlink resource block set, or flexible resource block set based on the size (e.g., in kHz) occupied by the two guard bands.

Figure 15:
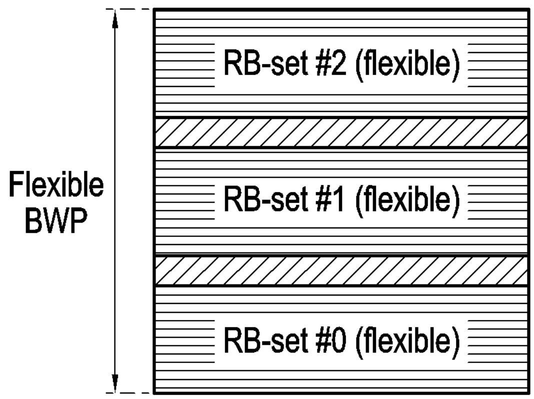
FIG. 15 is a view illustrating an example of a frequency domain resource block set configuration of a flexible bandwidth part in a wireless communication system according to an embodiment of the disclosure.

In this case, a new bandwidth part configuration may be used to support the XDD system. For example, as shown in FIG. 15, the UE may be configured with a flexible bandwidth part, rather than an uplink bandwidth part or downlink bandwidth part. FIG. 15 is a view illustrating an example in which a flexible bandwidth part is configured to support the XDD system. The flexible bandwidth part may be determined to be, e.g., an uplink bandwidth part, a downlink bandwidth part, or a hybrid (or XDD) bandwidth part of uplink and downlink bandwidth parts according to at least one or a combination of the methods described below. For example, at least one resource block set configured in the flexible bandwidth part may be determined to be one of an uplink resource block set, a downlink resource block set, or a flexible resource block set. Meanwhile, the flexible bandwidth part may be additionally configured in at least one bandwidth part of the uplink or downlink bandwidth part, be configured to replace at least one bandwidth part of the uplink or downlink bandwidth part, or be configured independently without the uplink or downlink bandwidth part configuration.

The UE may determine whether to use the flexible resource block set for uplink transmission or downlink reception. In other words, it may be determined using one or more of the methods described below whether the flexible resource block set is a downlink resource block set or an uplink resource block set.

Method 1: Determine based on the uplink transmission or downlink reception information indicated in the DCI.

The UE may determine whether the flexible resource block set is a downlink resource block set or an uplink resource block set through the DCI received from the base station. For example, the UE, scheduled to receive the PDSCH through the DCI, may determine that the flexible resource block set is a downlink resource block set when at least one RB of the frequency resources allocated the PDSCH is included in the flexible resource block set. As another example, the UE, scheduled to transmit the PUSCH through the DCI, may determine that the flexible resource block set is an uplink resource block set when at least one RB of the frequency resources allocated the PUSCH is included in the flexible resource block set. Likewise, the UE, receiving the DCI indicating, e.g., aperiodic CSI-RS reception, SRS transmission, or PRACH transmission, may determine whether the flexible resource block set is a downlink resource block set or an uplink resource block set when at least one RB or RE of the frequency resource allocated the aperiodic CSI-RS, SRS, or PRACH is included in the flexible resource block set.

A method in which the UE determines the frequency domain configuration for resource block set(s) in the downlink bandwidth part is described with the example of FIG. 13 part (a). If the UE receives DCI indicating aperiodic CSI-RS reception, and at least one RE or RB of the aperiodic CSI-RS indicated through the DCI is included in or crosses the flexible resource block set (RBset #1), the UE may determine that the flexible resource block set (RBset #1) is a downlink resource block set.

Likewise, a method in which the UE determines a frequency domain configuration for the resource block set in the uplink bandwidth part is described with the example of FIG. 14 part (c). If the UE receives DCI indicating SRS or PRACH transmission, and at least one RE or RB of the SRS or PRACH resource indicated through the DCI is included in or crosses the flexible resource block set (RBset #1), the UE may determine that the flexible resource block set (RBset #1) is an uplink resource block set.

Method 2: Determine through the indicator indicated through the DCI.

The base station may include a field, which may notify or indicate information about whether the flexible resource block set is a downlink resource block set or an uplink resource block set, in at least one DCI (e.g., group common DCI commonly transmitted to a plurality of UE groups) among the DCIs received by the UE and transmit it to the UE. In this case, transmission of the information through the group common DCI is merely an example, and the information may also be transmitted through a cell common DCI or UE-specific DCI.

The UE, receiving the DCI from the base station, may determine which resource set (e.g., flexible resource block set) is a downlink resource block set or an uplink resource block set depending on the information of the field included in the DCI. For example, the base station may configure a bitmap with the same size (i.e., N bits) as the number N of resource block sets included in one of the cell, carrier, or bandwidth part, for the cell, carrier, or bandwidth part, and indicate, to the UE, whether the resource block set is a downlink resource block set or an uplink resource block set using the bitmap. In this case, the most significant bit to the least significant bit of the bitmap may be mapped sequentially in the order in which the resource block set index increases from the resource block set with the lowest resource block set index. For example, it may be predefined between the base station and the UE that the bitmap value of 0 means the downlink resource block set, and 1 means the uplink resource block set. Or, the base station may configure bitmap value(s) to the UE through a higher layer signal. In the foregoing example, the bitmap value being 0 is defined as meaning the uplink resource block set, and 1 is defined as meaning the downlink resource block set, but they may be defined otherwise.

Meanwhile, using the bitmap is merely an example, and it is possible to include, in the DCI, information representable with $\lceil \log_2 N \rceil$ bits or fewer bits than $\lceil \log_2 N \rceil$, or a table constituted of combinations of information, or fields constituted of information corresponding thereto. In this case, the information representable with $\lceil \log_2 N \rceil$ bits or fewer bits than $\lceil \log_2 N \rceil$ or a table constituted of combinations of information, or information corresponding thereto may be predefined between the base station and the UE or be configured to the UE through higher layer signal from the base station.

A method for determining a frequency domain configuration for resource block sets by a UE for a downlink bandwidth part is described below with reference to the example of FIG. 13. The base station configures a 3-bit bitmap for a cell, carrier, or bandwidth part constituted of three resource block sets (N=3) and transmits a DCI including the bitmap information to the UE. The UE, receiving the DCI, determines the resource block set configuration for each resource block set through the bitmap information. For example, when the value of the bitmap received by the UE in FIG. 13 part (a) is 0 0 0, the UE may determine that RBset #0, RBset #1, and RBset #2 all are downlink resource block sets. As another example, when the value of the received bitmap is 0 1 0, the UE may determine that RBset #0 and RBset #2 are downlink resource block sets, and RBset #1 is an uplink resource block set.

A method for determining a frequency domain configuration for resource block sets by a UE for an uplink bandwidth part is described below with reference to the example of FIG. 14 part (a). When the value of the bitmap included in the DCI received by the UE from the base station is 1 0 1, the UE may determine that RBset #0 and RBset #2 are uplink resource block sets, and RBset #1 is a downlink resource block set. When the value of the received bitmap is 1 1 1, the UE may determine that RBset #0, RBset #1, and RBset #2 all are uplink resource block sets. In this case, when the configuration of the resource block set is a resource block set configured as an uplink resource block set or downlink resource block set through a higher layer signal (e.g., XDD-UL-DL-Configuration), the base station may not be allowed to indicate the resource block set, configured as the uplink resource block set through the higher layer signal, as a downlink resource block set through the DCI or may not be allowed to indicate the resource block set, configured as the downlink resource block set through the higher layer signal, as an uplink resource block set through the DCI.

In other words, the base station indicates the resource block set, configured as an uplink resource block set through the higher layer signal (XDD-UL-DL-Configuration), always as an uplink resource block set (or flexible resource block set) through the DCI and indicates the resource block set, configured as a downlink resource block set through the higher layer signal (XDD-UL-DL-Configuration), always as a downlink resource block set (or flexible resource block set) through the DCI. Meanwhile, the UE may assume that, for the resource block set configured as a flexible resource block set through the higher layer signal (XDD-UL-DL-Configuration) or the resource block set failing to be configured with or receive the higher layer signal (XDD-UL-DL-Configuration), the resource block set may be a downlink resource block set or an uplink resource block set.

In this case, the base station may indicate, to the UE, whether the flexible resource block set is a downlink resource block set or an uplink resource block set using a bitmap with the same size as the number of flexible resource block sets included in one of the cell, carrier, or bandwidth part, for the cell, carrier, or bandwidth part. In this case, the size of the bitmap may be equal to the number of flexible resource block sets included in each of the uplink bandwidth part and the downlink bandwidth part or may be determined to be the largest number of the numbers of the flexible resource block sets included in the uplink bandwidth part and the downlink bandwidth part.

The most significant bit to the least significant bit of the bitmap may be mapped sequentially in the order in which the resource block set index increases from the flexible resource block set with the lowest resource block set index. In this case, it may be predefined between the base station and the UE that the bitmap value of 0 means the downlink resource block set, and 1 means the uplink resource block set. Or, the base station may configure bitmap value(s) to the UE through a higher layer signal. In the foregoing example, the bitmap value being 0 is defined as meaning the uplink resource block set, and 1 is defined as meaning the downlink resource block set, but they may be defined otherwise.

In the example of FIG. 13 part (b), the base station may configure the resource block set RBset #1 as a downlink resource block set or uplink resource block set and RBset #0 as a flexible resource block set, using the higher layer signal transmitted to the UE, for the cell, carrier, or bandwidth part constituted of two resource block sets. Further, the base station may configure bitmap information including a bitmap with the same size (i.e., N1 bits) as the number N1 of the resource block sets configured as flexible resource block sets through the higher layer signal among the resource block sets included in the cell, carrier, or bandwidth part and transmits a DCI including the bitmap information to the UE. The UE, receiving the DCI, determines the resource block set configuration for each resource block set, included in the cell, carrier, or bandwidth part, through the bitmap information. For example, if the value corresponding to the received bitmap information is 0, the UE may determine that RBset #0 is a downlink resource block set. In contrast, when the value corresponding to the received bitmap information is 1, the UE may determine that RBset #0 is an uplink resource block set.

According to an embodiment of the disclosure, each bit of the bitmap may indicate, to the UE, one or more resource block sets where downlink reception or uplink transmission is possible (or impossible). In other words, the base station may include a field, which may notify or indicate information about whether the flexible resource block set is a resource block set capable (or incapable) of downlink reception or uplink transmission, in at least one DCI (e.g., group common DCI commonly transmitted to a plurality of UE groups) among the DCIs received by the UE and transmit it to the UE. The type of the DCI used in this case is not limited to the group common DCI, and the information may also be transmitted through a cell common DCI or UE-specific DCI.

The UE, receiving the DCI from the base station, may determine whether the flexible resource block set is a resource block set capable (or incapable) of downlink reception. Or, the UE may determine whether the flexible resource block set is a resource block set capable (or incapable) of uplink transmission.

A method in which the UE determines whether the flexible resource block set is a resource block set capable (or incapable) of downlink reception for the downlink bandwidth part is described below with reference to the example of FIG. 13 part (a). When the value of the bitmap included in the DCI received from the base station by the UE is 1 1 1, the UE may determine that RBset #0, RBset #1, and RBset #2 all are resource block sets capable of downlink reception. If the value of the bitmap received by the UE is 1 0 1, the UE may determine that RBset #0 and RBset #2 are resource block sets capable of downlink reception, but RBset #1 is a resource block set incapable of downlink reception.

A method in which the UE determines whether the flexible resource block set is a resource block set capable (or incapable) of uplink transmission for the uplink bandwidth part is described below with reference to the example of FIG. 14 part (a). When the value of the bitmap included in the DCI received from the base station by the UE is 1 1 1, the UE may determine that RBset #0, RBset #1, and RBset #2 all are resource block sets capable of uplink transmission. If the value of the bitmap received by the UE is 0 1 1, the UE may determine that RBset #0 and RBset #2 are resource block sets capable of uplink transmission, but RBset #0 is a resource block set incapable of uplink transmission.

Figure 16:
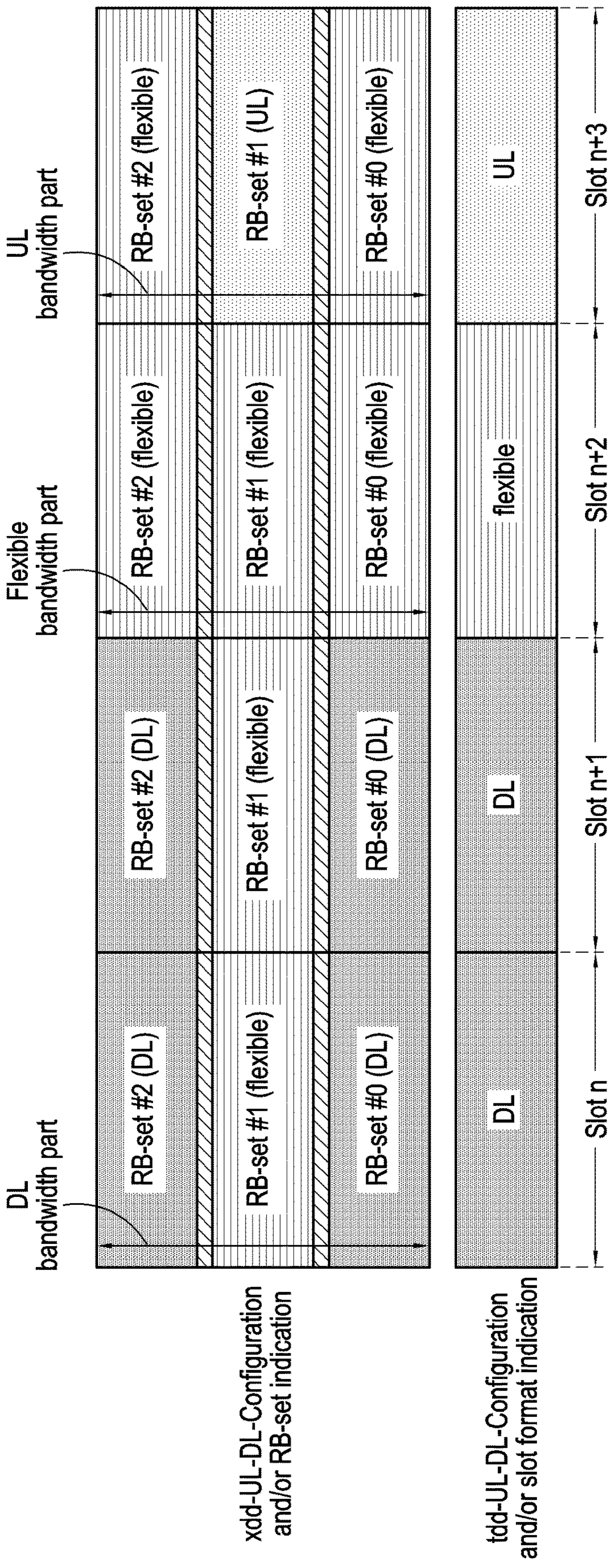
FIG. 16 is a view illustrating an example of a time domain uplink and downlink configuration and frequency domain resource block set configuration in a wireless communication system according to an embodiment of the disclosure.

FIG. 16 is a view illustrating a method for determining a time and frequency domain uplink and downlink configuration by a UE configured with an uplink and downlink configuration (e.g., XDD-UL-DL-Configuration) in the frequency domain and/or an uplink and downlink configuration (e.g., tdd-UL-DL-Configuration) in the time domain through a higher layer signal from the base station. FIG. 16 assumes a UE configured with the downlink resource block set as shown in FIG. 13 part (a), the uplink resource block set as shown in FIG. 14 part (a), and the flexible resource block set as shown in FIG. 15.

The UE may determine time domain uplink and downlink configuration information using at least one of the time domain uplink and downlink configuration information configured by the base station and the slot format indicator received through the DCI. FIG. 16 illustrates a case in which in the UE, the time domain uplink and downlink configuration information of slot n, slot n+1, slot n+2, and slot n+3 are indicated as a downlink slot, a downlink slot, a flexible slot, and an uplink slot, respectively. For convenience of description, although it is assumed that they are indicated as the downlink slot, flexible slot, and uplink slot in slot units, the same may be applied even where they are indicated as a downlink symbol, a flexible slot, or an uplink symbol in symbol units in one slot.

The UE determines that RBset #0, RBset #1, and RBset #2, respectively, are a downlink resource block set, a flexible resource block set, and a downlink resource block set, based on the block set configuration information of the frequency domain resource for the downlink bandwidth part, in slot n and slot n+1 indicated as downlink slots. As in method 2 described above, the UE may determine whether the resource block set determined to be a flexible resource block set is a resource block set capable (or incapable) of downlink reception or whether the resource block set determined to be a flexible resource block set is a resource block set capable (or incapable) of uplink transmission, through the bitmap information in the DCI received from the base station. In this case, it may be determined whether the bitmap information is information about the downlink bandwidth part or the uplink bandwidth part, based on the indication of the slot format indicator or uplink and downlink configuration in the time domain.

For example, when the bitmap information is 1 0 1 in slot n and slot n+1 configured or indicated as downlink slots in the slot format indicator or uplink and downlink configuration in the time domain in FIG. 16, the UE may determine that, among the resource block sets in the downlink bandwidth part, RBset #0 and RBset #2 are downlink resource block sets or resource block sets capable of downlink reception. Further, the UE may determine that RBset #1 is an uplink resource block set or a resource block set incapable of downlink reception. The UE may perform or may not perform downlink reception according to the result of determination on resource block set(s). In other words, the UE may not perform the downlink reception operation on RBset #1. In this case, RBset #0 and RBset #2 may be resource block sets configured as downlink resource block sets by different configurations or may be determined to be resource block sets capable of downlink reception regardless of the bitmap information, or regarded as downlink resource block sets without a separate determination process.

When the bitmap information is 1 0 1 in slot n+3 configured or indicated as a downlink slot in the slot format indicator or uplink and downlink configuration in the time domain in FIG. 16, the UE may determine that, among the resource block sets in the uplink bandwidth part, RBset #0 and RBset #2 are uplink resource block sets or resource block sets capable of uplink transmission. In this case, RBset #1 may be a resource block set configured as an uplink resource block set by a different configuration, be determined to be a resource block set capable of uplink transmission regardless of bitmap information, or regarded as an uplink resource block set regardless of a separate determination process. The UE may perform or may not perform uplink reception according to the result of determination on resource block set(s).

When the UE is not configured with the type for resource block set(s) of the flexible bandwidth part, the UE may assume that the flexible bandwidth part is a downlink bandwidth part or an uplink bandwidth part. In this case, the UE may determine whether one or more flexible resource block sets in the bandwidth part are resource block sets capable of downlink reception or resource block sets incapable of downlink reception (when assumed to be a downlink bandwidth part), the UE may determine whether the flexible resource block set is a resource block set capable of uplink transmission or a resource block set incapable of uplink transmission (when assumed to be an uplink bandwidth part). For example, in the case of slot n+2 configured or indicated as a flexible slot according to the slot format indicator or uplink and downlink configuration in the time domain in FIG. 16, the UE may determine whether the flexible resource block set is a resource block set capable of downlink reception or a resource block set incapable of downlink reception by applying the bitmap information (e.g., 1 0 1) and assuming the downlink bandwidth part.

When the UE is configured with the type of the resource block set(s) of the flexible bandwidth part, the UE may determine whether the flexible resource block set(s) is a resource block set capable (or incapable) of downlink reception or a resource block set capable (or incapable) of uplink transmission by applying the bitmap information to the flexible bandwidth part. For example, the UE may determine that, among the bitmap values, 0 is a resource block set capable (or incapable) of downlink reception, and the bitmap 1 is a resource block set capable (or incapable) of uplink transmission and perform uplink transmission or downlink reception according to the determination result.

The slot or symbol range where the bitmap information is valid or persistent or remaining may be determined as follows.

The UE may determine that the bitmap information is valid or persistent from the first (or last) symbol of the PDCCH where the DCI including the bitmap information is transmitted or from the first (or last) symbol of the control resource set where the PDCCH is transmitted.

In an embodiment, the UE may determine that the bitmap information is valid or persistent up to the slot or symbol corresponding to one of the following.

Downlink slot or symbol configured or indicated according to the slot format indicator or uplink and downlink configuration in the time domain.

Slot or symbol immediately before the first uplink slot or symbol configured or indicated according to the slot format indicator or uplink and downlink configuration in the time domain.

Downlink slot or symbol and flexible slot or symbol configured or indicated according to the slot format indicator or uplink and downlink configuration in the time domain.

Symbol immediately before the first symbol of the subsequent control resource set or subsequent PDCCH where the DCI including the subsequent bitmap information may be transmitted. Here, the subsequent PDCCH or subsequent control resource set may be periodically transmitted.

Other embodiments for indicating the resource block set configuration for flexible resource block set(s) included in the cell, carrier, or bandwidth part are described below.

In an embodiment, the base station may indicate or provide, to the UE through the DCI, information indicating a resource block set format indicator (RB-set Format Indicator (RFI)) or a resource block set format indicator pattern. The resource block set format indicator or resource block set format indicator pattern indicates that, for the cell, carrier, or bandwidth part, the flexible resource block set included in one of the cell, carrier, or bandwidth part is at least one of a downlink resource block set, a flexible resource block set, or an uplink resource block set.

Hereinafter, for convenience of description, the resource block set format indicator may be referred to as indicator information or indicator configuration information. In the following description of the disclosure, the indicator information is regarded as indicator information for the resource block set configured as a flexible resource block set through a higher signal, which is described. As an embodiment, the indicator information may provide resource block set format indicator information about the resource block set configured as an uplink or downlink resource block set through a higher signal, as well as the resource block set configured as the flexible resource block set. As an embodiment, the resource block set configured as an uplink or downlink resource block set through a higher signal cannot be indicated as or changed into a downlink resource block set or uplink resource block set by the indicator information. In other words, for the resource block set configured as an uplink or downlink resource block set through a higher signal, the indicator information may be indicated as an uplink or downlink resource block set.

Table 19 shows an example of indicator information indicating at least one resource block set among a downlink resource block set, a flexible resource block set, or an uplink resource block set for each of N flexible resource block sets. Here, N may be the value representing the largest number of the numbers of flexible resource block sets included in one of the uplink or downlink cell, carrier, or bandwidth part, for the uplink or downlink cell, carrier, or bandwidth part. Further, in the foregoing, the DCI may be a DCI commonly related to the UE group where at least one UE is included and/or a DCI related to a specific UE. The UE, receiving indicator information for the flexible resource block set, e.g., one of the RFI configurations of Table 19, through the DCI, may determine that, according to the indicated RFI configuration, each flexible resource block set is one of a downlink resource block set, a flexible resource block set, or an uplink resource block set.

TABLE 19

| RFI Configuration | 1st RB-set | 2nd RB-set | . . . Nth RB-set |
|---|---|---|---|
| 0 | DL (UL) | DL (UL) | . . . DL (UL) |
| 1 | X | DL (UL) | . . . DL (UL) |
| 2 | DL (UL) | X | . . . DL (UL) |
| . . . | . . . | . . . | . . . . . . |
| K-1 | X | X | . . . DL (UL) |
| K | X | X | . . . X |

In Table 19, the UE, receiving the indicator information, may determine the resource block set indicated as X, as follows. In an embodiment, for the slot indicated as a downlink slot through the slot format indicator, the UE may determine that the resource block set indicated as X is a flexible resource block set or an uplink resource block set and, for the slot indicated as an uplink slot through the slot format indicator, the UE may determine that the resource block set indicated as X is a flexible resource block set or a downlink resource block set. In an embodiment, the UE may determine the resource block set indicated as X is a flexible resource block set all the time regardless of the slot format indicated through the slot format indicator. In Table 19, K may be equal to or smaller than $2^N-1$ which is the number of cases needed to provide indicator information for N resource block sets. Further, K may be equal to or smaller than $2^M-1$ which is the number of configurations that may be indicated with the size (M bits) of the field indicating the indicator information in the DCI. As an embodiment, the UE may be configured with, or receive, at least one value of M or K, from the base station through a higher signal.

In the embodiment described below, the resource block set format indicator (RFI) provided through the DCI by the base station may indicate whether the flexible resource block set included in one of the cell, carrier, or bandwidth part, for the cell, carrier, or bandwidth part, is a resource block set capable of downlink reception or uplink transmission or whether the flexible resource block set is a resource block set incapable of downlink reception or uplink transmission. Hereinafter, for convenience of description, the resource block set format indicator may be referred to as indicator information or indicator configuration information.

Table 20 shows an example of indicator information indicating whether each of N flexible resource block sets is a resource block set capable of downlink reception or uplink transmission or the flexible resource block set is a resource block set incapable of downlink reception or uplink transmission.

TABLE 20

| RFI Configuration | 1st RB-set | 2nd RB-set | . . . Nth RB-set |
|---|---|---|---|
| 0 | Available | Available | . . . Available |
| 1 | Unavailable | Available | . . . Available |
| 2 | Available | Unavailable | . . . Available |
| . . . | . . . | . . . | . . . . . . |
| K-1 | Unavailable | Unavailable | . . . Available |
| K | Unavailable | Unavailable | . . . Unavailable |

In Table 20, the UE, receiving the indicator information, may determine whether the indicated flexible resource block set is a resource block set capable of downlink reception or uplink transmission or the flexible resource block set is incapable of downlink reception or uplink transmission, as follows.

In an embodiment, for the resource block set indicated as available of the slot indicated as a downlink slot through the slot format indicator, the UE may receive the downlink signal or channel in the indicated flexible resource block set, e.g., at least one signal or channel of the PDCCH, CSI-RS, or SS/PBCH configured to be received in the flexible resource block set. For the resource block set indicated as unavailable of the slot indicated as a downlink slot through the slot format indicator, the UE may not receive the downlink signal or channel in the indicated flexible resource block set, e.g., at least one signal or channel of the PDCCH, CSI-RS, or SS/PBCH configured to be received in the flexible resource block set. In an embodiment, when some resources (e.g., at least one PRB or at least one of the RE, REG, or CCE) of the configured downlink signal or channel overlaps, or is included in, the resource block set indicated as unavailable, the UE may not receive the entire downlink signal or channel. In an embodiment, the UE may not receive the downlink signal or channel only in the area overlapping the resource block set indicated as unavailable of the downlink signal or channel.

In an embodiment, for the resource block set indicated as available of the slot indicated as an uplink slot through the slot format indicator, the UE may transmit the uplink signal or channel in the indicated flexible resource block set, e.g., at least one signal or channel of the PUCCH, PUSCH, SRS, or PRACH configured to be transmitted in the flexible resource block set. For the resource block set indicated as unavailable of the slot indicated as an uplink slot through the slot format indicator, the UE may not transmit the uplink signal or channel in the indicated flexible resource block set, e.g., at least one signal or channel of the PUCCH, PUSCH, SRS, or PRACH configured to be transmitted in the flexible resource block set. In an embodiment, when some resources (e.g., at least one PRB or at least one of the REs) of the configured uplink signal or channel overlaps, or is included in, the resource block set indicated as unavailable, the UE may not transmit the entire uplink signal or channel. In an embodiment, the UE may not transmit the uplink signal or channel only in the area overlapping the resource block set indicated as unavailable of the uplink signal or channel.

In Table 20, K may be equal to or smaller than $2^N-1$ which is the number of cases needed to provide indicator information for N resource block sets. Further, K may be equal to or smaller than $2^M-1$ which is the number of configuration information that may be indicated with the size (M bits) of the field indicating the indicator information in the DCI. As an embodiment, the UE may be configured with, or receive, at least one value of M or K, from the base station through a higher signal.

As an embodiment, information about the resource block set(s) indicated through each configuration (i.e., RFI configuration) of Tables 19 and 20 may be predefined between the base station and the UE or be provided or configured to the UE through a higher signal from the base station.

For example, RFI configuration 2 of Table 19 may indicate that, among the N resource block sets configured to the UE from the base station through a higher signal, the first resource block set is DL (or UL), the second resource block set is X, . . . , and the Nth resource block set is DL (or UL). For example, RFI configuration 2 of Table 20 may indicate that, among the N resource block sets configured to the UE from the base station through a higher signal, the first resource block set is capable of downlink reception or uplink transmission, the second resource block set is incapable of downlink reception or uplink transmission, . . . , and the Nth resource block set is capable of downlink reception or uplink transmission.

This is described below in greater detail with reference to the example of FIG. 16. Here, FIG. 16 is a view illustrating a method for determining a time and frequency domain uplink and downlink configuration by a UE configured with an uplink and downlink configuration (e.g., XDD-UL-DL-Configuration) in the frequency domain and/or an uplink and downlink configuration (e.g., tdd-UL-DL-Configuration) in the time domain through a higher layer signal from the base station. FIG. 16 assumes a UE configured with the downlink resource block set as shown in FIG. 13 part (a), the uplink resource block set as shown in FIG. 14 part (a), and the flexible resource block set as shown in FIG. 15.

The UE may determine time domain uplink and downlink configuration information using at least one of the time domain uplink and downlink configuration information configured by the base station and the slot format indicator received through the DCI. FIG. 16 illustrates a case in which in the UE, the time domain uplink and downlink configuration information of slot n, slot n+1, slot n+2, and slot n+3 are indicated as a downlink slot, a downlink slot, a flexible slot, and an uplink slot, respectively. For convenience of description, although it is assumed that they are indicated as the downlink slot, flexible slot, and uplink slot in slot units, the same may be applied even where they are indicated as a downlink symbol, a flexible slot, or an uplink symbol in symbol units in one slot.

The UE determines that resource block set #0, resource block set #1, and resource block set #2, respectively, are a downlink resource block set, a flexible resource block set, and a downlink resource block set, based on the block set configuration information of the frequency domain resource for the downlink bandwidth part, in slot n and slot n+1 indicated as downlink slots.

As an example, as in method 2 and Table 19 described above, the UE may determine whether the resource block set determined to be a flexible resource block set is a downlink resource block set, an uplink resource block set, or a flexible resource block set, through the indicator information in the DCI received from the base station.

As another example, as in method 2 and Table 20 described above, the UE may determine whether the resource block set determined to be a flexible resource block set is a resource block set capable (or incapable) of downlink reception or whether the resource block set determined to be a flexible resource block set is a resource block set capable (or incapable) of uplink transmission, through the indicator information in the DCI received from the base station.

In this case, it may be determined that the indicator information is information applied to the downlink bandwidth part or information applied to the uplink bandwidth part, based on the indication of the slot format indicator or uplink and downlink configuration in the time domain. For example, when the indicator information indicates configuration 2 of Table 19 in slot n and slot n+1 configured or indicated as downlink slots in the slot format indicator or uplink and downlink configuration in the time domain in FIG. 16, the UE may determine that the indicator information is information applied to the downlink bandwidth part and that among the resource block sets in the downlink bandwidth part, resource block set #2 is a flexible resource block set or a resource block set not receiving a downlink signal or channel. In this case, resource block set #0 and resource block set #1 may be determined to be downlink resource block sets.

As another example, when the indicator information indicates configuration 1 of Table 19 in slot n+2 indicated or configured as a flexible slot in the slot format indicator or uplink and downlink configuration in the time domain in FIG. 16, the UE may determine that the indicator information is applied to the flexible bandwidth part if configured with a flexible bandwidth part. If not configured with a flexible bandwidth part, the UE may determine that the indicator information is information applied to the downlink bandwidth part.

When the UE is not configured with a flexible bandwidth part, in slot n+2, the UE may determine that the indicator information is applied to the downlink bandwidth part for symbols (e.g., PDCCH or CSI-RS reception) configured to receive a downlink signal or channel and determine that the indicator information is applied to the uplink bandwidth part for symbols (e.g., at least one of SRS, PUCCH, PUSCH, or PRACH) configured to transmit an uplink signal or channel.

As an embodiment, the range of slots or symbols where the indicator information is valid or persistent or remaining may be determined as follows.

The UE may determine that the indicator information is valid or persistent from the first (or last) symbol of the PDCCH where the DCI including the indicator information is transmitted or from the first (or last) symbol of the control resource set where the PDCCH is transmitted.

The UE may determine that the indicator information is valid or persistent up to the slot or symbol corresponding to one of the following.

Downlink slot or symbol configured or indicated according to the slot format indicator or uplink and downlink configuration in the time domain.

Slot or symbol immediately before the first uplink slot or symbol configured or indicated according to the slot format indicator or uplink and downlink configuration in the time domain.

Downlink slot or symbol and flexible slot or symbol configured or indicated according to the slot format indicator or uplink and downlink configuration in the time domain.

Symbol immediately before the first symbol of the subsequent control resource set or subsequent PDCCH where the DCI including the subsequent indicator information may be transmitted. Here, the subsequent PDCCH or subsequent control resource set may be periodically transmitted.

Figure 17:
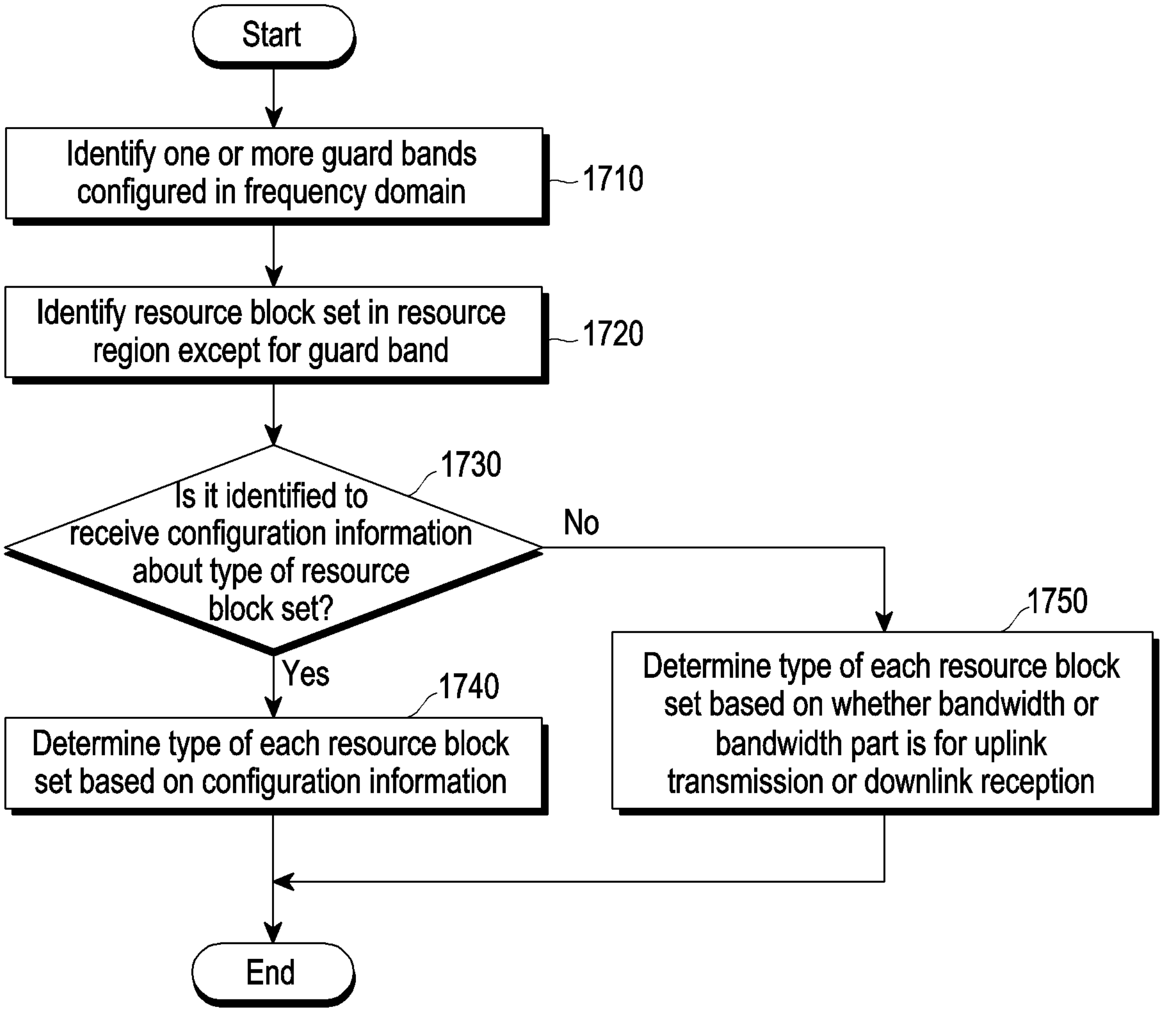
FIG. 17 is a flowchart illustrating configuring a frequency domain resource for uplink transmission or downlink reception by a UE in a wireless communication system.

FIG. 17 is a flowchart illustrating configuring a frequency domain resource for uplink transmission or downlink reception by a UE in a wireless communication system.

The controller of the UE identifies one or more guard bands configured in the frequency domain (1710). The frequency domain is, e.g., a cell bandwidth or a bandwidth part configured in the UE. The one or more guard bands may be previously defined or be selected from among a plurality of frequency bands configured through higher layer signaling.

The controller of the UE identifies one or more resource block sets in the resource region except for the one or more guard bands in the bandwidth part configured in the UE or the cell bandwidth (1720). This operation may be performed using, e.g., one or more guard bands. Meanwhile, a resource block set may be configured without configuring a guard band. In this case, the number of guard bands identified in step 1710 may be 0. The controller of the UE may identify whether configuration information about the type of the resource block set is received (1730).

According to an embodiment of the disclosure, the configuration information may be provided periodically, and the UE may determine that the configuration information is valid until the subsequent configuration information is provided.

Upon receiving the configuration information, the controller of the UE determines whether the type of each resource block set is a resource block set for downlink, a resource block set for uplink, or a flexible resource block set (or resource block set for XDD), based on the configuration information (1740). When the configuration information is not received, the controller of the UE determines whether the type of each resource block set is a resource block set for downlink, a resource block set for uplink, or a flexible resource block set, based on whether the bandwidth or the bandwidth part is one for uplink transmission or downlink reception (1750). In this case, the controller may determine that the one or more resource block sets all are downlink resource block sets for the time range which is the downlink bandwidth or downlink bandwidth part, determine that the one or more resource block sets all are uplink resource block sets for the time range which is the uplink bandwidth or uplink bandwidth part, and determine that the one or more resource block sets are flexible resource block sets for the other cases.

The controller of the UE may determine a specific frequency region of the one or more resource block sets and the one or more guard bands using predefined resource block set pattern information. In this case, the one or more guard bands and the resource block set pattern may be defined according to the subcarrier spacing and bandwidth or bandwidth part size.

The controller of the UE may receive downlink control information (DCI) from the base station through the communication unit. The controller of the UE may determine whether the resource block set determined to be the flexible resource block set is to be used for downlink reception or uplink transmission, based on the channel or signal scheduled by the DCI and located in the resource block set determined to be the flexible resource block set. The channel or signal may include one or more of a physical downlink shared channel (PDSCH), a physical uplink shared channel (PUSCH), an aperiodic channel state information-reference signal (CSI-RS), a sounding reference signal (SRS), or a physical random access channel (PRACH).

The controller of the UE may determine whether the flexible resource block set scheduled in the DCI is a downlink resource block set or an uplink resource block set, based on the indicator included in the DCI. The indicator may have a bitmap in the same size as the number of flexible resource block sets scheduled in the DCI.

If the flexible resource block set scheduled in the DCI is included in the downlink bandwidth part, the controller of the UE may determine whether downlink reception is possible in the flexible block set, based on the indicator included in the DCI. Or, if the flexible resource block set scheduled in the DCI is included in the uplink bandwidth part, it may be determined whether uplink reception is possible in the flexible block set based on the indicator included in the DCI. The controller of the UE may perform downlink reception or uplink transmission according to the determination result.

Figure 18:
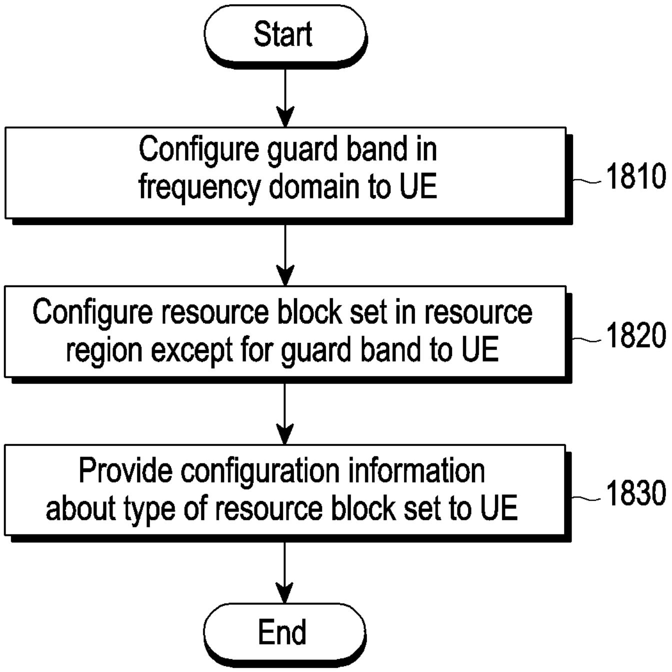
FIG. 18 is a flowchart illustrating configuring a frequency domain resource for uplink reception or downlink transmission by a base station in a wireless communication system.

FIG. 18 is a flowchart illustrating configuring a frequency domain resource for uplink reception or downlink transmission by a base station in a wireless communication system.

The controller of the base station configures one or more guard bands configured in the frequency domain to the UE (1810). The frequency domain is, e.g., a cell bandwidth or a bandwidth part configured in the UE. The one or more guard bands may be selected from among a plurality of predetermined frequency bands. Meanwhile, a resource block set may be configured without configuring a guard band. In this case, the number of guard bands identified in step 1810 may be 0.

The controller of the base station configures one or more resource block sets in the resource region except for the one or more guard bands in the bandwidth part configured in the UE or the cell bandwidth, to the UE (1820). This operation may be performed using, e.g., one or more guard bands. The controller of the base station may control the communication unit to provide configuration information about the type of the resource block set to the UE (1830).

The configuration information may include information for determining whether the type of each resource block set is a downlink resource block set, an uplink resource block set, or a flexible resource block set. The configuration information may be provided to the UE periodically or may also be provided aperiodically. The configuration information may be regarded as valid until subsequent configuration information is provided.

The guard band may be previously defined or be selected from among a plurality of frequency bands configured through higher layer signaling.

The base station may transmit downlink control information (DCI) to the UE through the communication unit. In this case, it may be determined whether the resource block set determined to be the flexible resource block set is to be used for downlink reception or uplink transmission, according to the channel or signal scheduled by the DCI. The channel or signal may include one or more of a physical downlink shared channel (PDSCH), a physical uplink shared channel (PUSCH), an aperiodic CSI-RS, an SRS, or a physical random access channel (PRACH). Or, the DCI may include an indicator for determining whether the flexible resource block set scheduled in the DCI is the downlink resource block set or the uplink resource block set.

The methods according to the embodiments descried in the specification or claims of the disclosure may be implemented in hardware, software, or a combination of hardware and software.

When implemented in software, there may be provided a computer readable storage medium or computer program product storing one or more programs (software modules). One or more programs stored in the computer readable storage medium or computer program product are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the disclosure, the term "computer program product" or "computer readable medium" is used to collectively refer to media, such as memory, a hard disk installed in a hard disk drive, and signals. The "computer program product" or "computer readable medium" may be used for frequency resource allocation in the wireless communication system according to the disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

The embodiments herein are provided merely for better understanding of the present invention, and the present invention should not be limited thereto or thereby. In other words, it is apparent to one of ordinary skill in the art that various changes may be made thereto without departing from the scope of the present invention. Further, the embodiments may be practiced in combination. For example, the base station and the UE may be operated in a combination of parts of an embodiment and another embodiment. Embodiments of the disclosure may be applied to other communication systems, and various modifications may be made thereto based on the technical spirit of embodiments of the disclosure. For example, embodiments of the disclosure may also be applied to LTE systems, 5G or NR systems.

The invention claimed is:

1. A method for configuring a frequency domain resource for uplink transmission or downlink reception performed by a user equipment (UE) in a wireless communication system, the method comprising:

identifying a guard band configured in a bandwidth of a cell or a bandwidth part configured for the UE;

identifying one or more resource block sets in a resource region except for the guard band in the bandwidth or the bandwidth part;

identifying whether configuration information on a type of a resource block set is received;

in case that the configuration information is received, determining whether a type of each resource block set is a downlink resource block set, an uplink resource block set, or a flexible resource block set, based on the configuration information; and in case that the configuration information is not received, determining whether the type of each resource block set is the downlink resource block set, the uplink resource block set, or the flexible resource block set based on whether the bandwidth or the bandwidth part is for the uplink transmission or the downlink reception.

2. The method of claim 1, wherein the one or more resource block sets are identified using the guard band, and wherein the guard band is predefined or is selected from among a plurality of frequency bands configured through higher layer signaling.

3. The method of claim 1, further comprising:

determining the guard band and a frequency area of the one or more resource block sets using predefined resource block set pattern information, wherein the guard band and the predefined resource block set pattern information are defined according to a subcarrier spacing and a size of the bandwidth or a size of the bandwidth part.

4. The method of claim 1, further comprising:

in case that the configuration information is not received, determining that, for a time range which is a downlink bandwidth or downlink bandwidth part, all of the one or more resource block sets are downlink resource block sets and, for a time range which is an uplink bandwidth or uplink bandwidth part, all of the one or more resource block sets are uplink resource block sets.

5. The method of claim 1, further comprising:

receiving downlink control information (DCI); and determining whether a resource block set determined to be the flexible resource block set is to be used for the downlink reception or the uplink transmission, based on a channel or signal scheduled by the DCI in the resource block set determined to be the flexible resource block set, wherein the channel or signal includes one or more of a physical downlink shared channel (PDSCH), a physical uplink shared channel (PUSCH), an aperiodic channel state information reference signal (CSI-RS), a sounding reference signal (SRS), or a physical random access channel (PRACH).

6. The method of claim 1, further comprising:

receiving downlink control information (DCI); and determining whether a flexible resource block set scheduled in the DCI is the downlink resource block set or the uplink resource block set, based on an indicator included in the DCI, wherein the indicator includes a bitmap in the same size as the number of flexible resource block sets scheduled in the DCI or indicator information indicating that each of at least one flexible resource block set included in one of an uplink or downlink cell, carrier, or bandwidth part is one of a downlink resource block set, a flexible resource block set, or an uplink resource block set.

7. The method of claim 1, further comprising:
receiving downlink control information (DCI);
in case that a flexible resource block set scheduled in the DCI is included in a downlink bandwidth part, determining whether the downlink reception is possible in the flexible resource block set based on an indicator included in the DCI; and
in case that the flexible resource block set scheduled in the DCI is included in an uplink bandwidth part, determining whether the uplink transmission is possible in the flexible resource block set based on the indicator included in the DCI.

8. A method for configuring a frequency domain resource for uplink reception or downlink transmission performed by a base station in a wireless communication system, the method comprising:
configuring a user equipment (UE) with information indicating a guard band in a bandwidth of a cell or a bandwidth part configured for the UE;
configuring the UE with information indicating one or more resource block sets in a resource region except for the guard band in the bandwidth or the bandwidth part;
determining whether to transmit configuration information on a type of a resource block set;
in case that the configuration information is determined to transmit, providing, to the UE, the configuration information on the type of the resource block set, wherein the configuration information includes information for determining whether a type of each resource block set is a downlink resource block set, an uplink resource block set, or a flexible resource block set; and
in case that the configuration information is determined not to transmit, determining whether the type of each resource block set is the downlink resource block set, the uplink resource block set, or the flexible resource block set based on whether the bandwidth or the bandwidth part is for the uplink transmission or the downlink reception.

9. The method of claim 8, wherein the guard band is predefined or is selected from among a plurality of frequency bands configured through higher layer signaling.

10. The method of claim 8, further comprising:
transmitting downlink control information (DCI) to the UE,
wherein whether a resource block set determined to be the flexible resource block set is to be used for the downlink transmission or the uplink reception is determined according to a channel or signal scheduled by the DCI, and
wherein the channel or signal includes one or more of a physical downlink shared channel (PDSCH), a physical uplink shared channel (PUSCH), an aperiodic channel state information reference signal (CSI-RS), a sounding reference signal (SRS), or a physical random access channel (PRACH).

11. The method of claim 8, further comprising:
transmitting downlink control information (DCI) to the UE,
wherein the DCI includes an indicator for determining whether a flexible resource block set scheduled in the DCI is the downlink resource block set or the uplink resource block set, and
wherein the indicator includes a bitmap in the same size as the number of flexible resource block sets scheduled in the DCI or indicator information indicating that each of at least one flexible resource block set included in one of an uplink or downlink cell, carrier, or bandwidth part is one of a downlink resource block set, a flexible resource block set, or an uplink resource block set.

12. A user equipment (UE) for configuring a frequency domain resource for uplink transmission or downlink reception in a wireless communication system, comprising:
a communication unit; and
a controller, wherein the controller is configured to:
identify a guard band configured in a bandwidth of a cell or a bandwidth part configured for the UE;
identify one or more resource block sets in a resource region except for the guard band in the bandwidth or the bandwidth part;
identify whether configuration information about a type of a resource block set is received;
in case that the configuration information is received, determine whether a type of each resource block set is a downlink resource block set, an uplink resource block set, or a flexible resource block set, based on the configuration information; and
in case that the configuration information is not received, determine whether the type of each resource block set is the downlink resource block set, the uplink resource block set, or the flexible resource block set based on whether the bandwidth or the bandwidth part is for the uplink transmission or the downlink reception.

13. The UE of claim 12, wherein the controller is further configured to:
receive a DCI; and
determine whether a flexible resource block set scheduled in the DCI is the downlink resource block set or the uplink resource block set, based on an indicator included in the DCI,
wherein the indicator includes a bitmap in the same size as the number of flexible resource block sets scheduled in the DCI or indicator information indicating that each of at least one flexible resource block set included in one of an uplink or downlink cell, carrier, or bandwidth part is one of a downlink resource block set, a flexible resource block set, or an uplink resource block set.

14. The UE of claim 12,
wherein the one or more resource block sets are identified using the guard band, and
wherein the guard band is predefined or is selected from among a plurality of frequency bands configured through higher layer signaling.

15. The UE of claim 12, wherein the controller is further configured to:
determine the guard band and a frequency area of the one or more resource block sets using predefined resource block set pattern information,
wherein the guard band and the predefined resource block set pattern information are defined according to a subcarrier spacing and a size of the bandwidth or a size of the bandwidth part.

16. The UE of claim 12, wherein the controller is further configured to:
in case that the configuration information is not received, determine that, for a time range which is a downlink bandwidth or downlink bandwidth part, all of the one or more resource block sets are downlink resource block sets and, for a time range which is an uplink bandwidth or uplink bandwidth part, all of the one or more resource block sets are uplink resource block sets.

17. The UE of claim 12, wherein the controller is further configured to:

receiving downlink control information (DCI); and determining whether a resource block set determined to be the flexible resource block set is to be used for the downlink reception or the uplink transmission, based on a channel or signal scheduled by the DCI in the resource block set determined to be the flexible resource block set, wherein the channel or signal includes one or more of a physical downlink shared channel (PDSCH), a physical uplink shared channel (PUSCH), an aperiodic channel state information reference signal (CSI-RS), a sounding reference signal (SRS), or a physical random access channel (PRACH).

18. The UE of claim 12, wherein the controller is further configured to:

receiving downlink control information (DCI);

in case that a flexible resource block set scheduled in the DCI is included in a downlink bandwidth part, determining whether the downlink reception is possible in the flexible resource block set based on an indicator included in the DCI; and in case that the flexible resource block set scheduled in the DCI is included in an uplink bandwidth part, determining whether the uplink transmission is possible in the flexible resource block set based on the indicator included in the DCI.

19. A base station for configuring a frequency domain resource for uplink reception or downlink transmission in a wireless communication system, comprising:

a communication unit; and a controller, coupled to the communication unit and configured to:

configure a user equipment (UE) with information indicating a guard band in a bandwidth of a cell or a bandwidth part configured for the UE;

configure the UE with information indicating one or more resource block sets in a resource region except for the guard band in the bandwidth or the bandwidth part; and determine whether to transmit configuration information on a type of a resource block set, in case that the configuration information is determined to transmit, provide, to the UE, the configuration information on the type of the resource block set, wherein the configuration information includes information for determining whether a type of each resource block set is a downlink resource block set, an uplink resource block set, or a flexible resource block set, and in case that the configuration information is determined not to transmit, determine whether the type of each resource block set is the downlink resource block set, the uplink resource block set, or the flexible resource block set based on whether the bandwidth or the bandwidth part is for the uplink transmission or the downlink reception.

20. The base station of claim 19, wherein the controller is further configured to:

transmit downlink control information (DCI) to the UE, wherein the DCI includes an indicator for determining whether a flexible resource block set scheduled in the DCI is the downlink resource block set or the uplink resource block set, and wherein the indicator includes a bitmap in the same size as the number of flexible resource block sets scheduled in the DCI or indicator information indicating that each of at least one flexible resource block set included in one of an uplink or downlink cell, carrier, or bandwidth part is one of a downlink resource block set, a flexible resource block set, or an uplink resource block set.

* * * * *